US008511714B2

(12) United States Patent
Marquis-Martin

(10) Patent No.: US 8,511,714 B2
(45) Date of Patent: Aug. 20, 2013

(54) CONNECTOR ASSEMBLIES FOR FLOW RESTRICTING APPARATUSES

(75) Inventor: Guillaume Hugo Marquis-Martin, Montreal (CA)

(73) Assignee: Ipex Technologies Inc., Mississauga, Ontario (CA)

(*) Notice: Subject to any disclaimer, the term of this patent is extended or adjusted under 35 U.S.C. 154(b) by 231 days.

(21) Appl. No.: 13/035,486

(22) Filed: Feb. 25, 2011

(65) Prior Publication Data
US 2012/0013118 A1 Jan. 19, 2012

Related U.S. Application Data

(60) Provisional application No. 61/399,726, filed on Jul. 16, 2010.

(51) Int. Cl.
*F16L 3/00* (2006.01)
(52) U.S. Cl.
USPC .......... 285/139.1; 285/139.2; 285/137.11; 285/305; 285/319; 285/921; 137/808; 137/812; 137/813; 251/148; 251/151
(58) Field of Classification Search
USPC .......... 137/808, 812, 813; 285/139.1, 139.2, 285/137.11, 305, 319, 921; 251/148, 151
See application file for complete search history.

(56) References Cited

U.S. PATENT DOCUMENTS

| 792,074 | A | * | 6/1905 | Rathburn | 285/317 |
| 823,346 | A | * | 6/1906 | Maxwell | 285/325 |
| 837,561 | A | | 12/1906 | Hacker | |
| 959,854 | A | * | 5/1910 | Grierson | 285/325 |
| 979,481 | A | * | 12/1910 | Hannold | 210/445 |
| 1,808,128 | A | | 6/1931 | Brocato | |
| 1,838,574 | A | * | 12/1931 | Ross | 285/325 |
| 2,265,268 | A | * | 12/1941 | Culligan | 285/325 |
| 2,396,295 | A | | 3/1946 | Spraragen | |
| 2,535,933 | A | | 12/1950 | Kubatzky | |
| 2,575,499 | A | | 11/1951 | Manow | |
| 2,644,390 | A | | 7/1953 | Delf et al. | |
| 3,195,303 | A | | 7/1965 | Widell | |
| 3,207,168 | A | | 9/1965 | Warren | |
| 3,215,165 | A | | 11/1965 | Boadway | |
| 3,219,048 | A | | 11/1965 | Palmisano | |

(Continued)

FOREIGN PATENT DOCUMENTS

GB 2334791 B 7/2002
GB 2405157 A 2/2005

(Continued)

*Primary Examiner* — John K Fristoe, Jr.
*Assistant Examiner* — Minh Le
(74) *Attorney, Agent, or Firm* — K&L Gates LLP

(57) ABSTRACT

A connector assembly for a flow restricting apparatus is disclosed. The flow restricting apparatus comprises an outlet configured to be in fluid communication with an outlet conduit. The connector assembly comprises a first member configured to be engaged with the flow restricting apparatus at least partially about the outlet. The first member comprises a first face, a second face, and a bore defined through the first member. The connector assembly comprises a second member comprising a first side, a second side, a bore defined through the second member, at least one projection extending outwardly from the first side of the second member, and sealing means for sealing positioned intermediate the first member and the second member. The at least one projection forms a receiving portion configured to receive a portion of the first member.

25 Claims, 41 Drawing Sheets

(56) References Cited

U.S. PATENT DOCUMENTS

| | | | |
|---|---|---|---|
| 3,513,865 | A | 5/1970 | Van Der Heyden |
| 3,789,589 | A | 2/1974 | Delany et al. |
| 4,168,232 | A | 9/1979 | Allen et al. |
| 4,206,783 | A | 6/1980 | Brombach |
| 4,365,980 | A | 12/1982 | Culbert et al. |
| 4,376,053 | A | 3/1983 | Bullock et al. |
| 4,483,774 | A | 11/1984 | Brill et al. |
| 4,512,492 | A | 4/1985 | Graybeal |
| 4,632,107 | A | 12/1986 | Butler |
| 4,701,196 | A | 10/1987 | Delany |
| 4,726,742 | A | 2/1988 | Harbison et al. |
| 4,743,280 | A | 5/1988 | Pappas |
| 4,834,142 | A | 5/1989 | Johannessen |
| 4,846,224 | A | 7/1989 | Collins, Jr. et al. |
| 4,889,166 | A | 12/1989 | Lakatos |
| 5,044,394 | A | 9/1991 | Brombach |
| 5,052,442 | A | 10/1991 | Johannessen |
| 5,080,137 | A | 1/1992 | Adams |
| 5,203,595 | A * | 4/1993 | Borzone et al. ............... 285/325 |
| 5,303,782 | A | 4/1994 | Johannessen |
| 5,337,789 | A | 8/1994 | Cook |
| 5,399,180 | A | 3/1995 | Kopp |
| 5,597,492 | A | 1/1997 | Felder |
| 5,640,988 | A | 6/1997 | Brereton |
| 5,788,291 | A * | 8/1998 | Williams et al. .............. 285/325 |
| 6,374,858 | B1 | 4/2002 | Hides et al. |
| 7,530,370 | B2 * | 5/2009 | Gross ......................... 137/899.2 |
| 7,604,262 | B2 * | 10/2009 | Elflein et al. .................. 285/347 |
| D660,405 | S * | 5/2012 | Marquis-Martin .......... D23/259 |
| 2012/0098254 | A1 * | 4/2012 | Marquis-Martin ........ 285/285.1 |

FOREIGN PATENT DOCUMENTS

| | | |
|---|---|---|
| GB | 2451285 A | 1/2009 |
| JP | 2004-238833 A | 8/2004 |
| JP | 2008-214948 A | 9/2008 |
| WO | WO 86/07417 A1 | 12/1986 |
| WO | WO 87/07048 A1 | 11/1987 |
| WO | WO 89/08750 A1 | 9/1989 |
| WO | WO 89/08751 A1 | 9/1989 |
| WO | WO 91/00388 A1 | 1/1991 |
| WO | WO 92/04667 A1 | 3/1992 |
| WO | WO 92/08059 A1 | 5/1992 |
| WO | WO 94/05867 | 3/1994 |
| WO | WO 94/08146 A1 | 4/1994 |
| WO | WO 99/35451 A1 | 7/1999 |
| WO | WO 99/43899 A2 | 9/1999 |
| WO | WO 2009/013509 A2 | 1/2009 |

* cited by examiner

CONNECTOR ASSEMBLIES FOR FLOW RESTRICTING APPARATUSES

PRIORITY CLAIM

The present application claims priority to: (1) U.S. provisional application Ser. No. 61/399,726, filed Jul. 16, 2010, entitled "CONNECTOR ASSEMBLIES FOR FLOW RESTRICTING APPARATUSES" by G. H. Marquis-Martin and (2) Canadian application No. 2,714,675, filed Sep. 10, 2010, entitled "CONNECTOR ASSEMBLIES FOR FLOW RESTRICTING APPARATUSES" by G. H. Marquis-Martin (which Canadian application claims priority to U.S. provisional application Ser. No. 61/399,726 referenced above).

FIELD

The present disclosure generally relates to flow restricting apparatuses and, more particularly, relates to connector assemblies for flow restricting apparatuses.

SUMMARY

In one general aspect, the present disclosure is directed, in part, to a connector assembly for a flow restricting apparatus. The flow restricting apparatus can be, for example, a P-trap assembly, an elbow, or other types of flow restricting devices or assemblies. In one embodiment, the flow restricting apparatus comprises an outlet configured to be in fluid communication with an outlet conduit. The connector assembly comprises a first member configured to be engaged with the flow restricting apparatus at least partially about the outlet. The first member comprises a first face, a second face, and a bore defined through the first member. The connector assembly comprises a second member comprising a first side, a second side, and a bore defined through the second member. The bore of the first member is configured to at least partially align with the bore of the second member when the first member is engaged with the second member. The connector assembly comprises at least one projection extending outwardly from the first side of the second member and sealing means for sealing positioned intermediate the first member and the second member. The at least one projection forms a receiving portion configured to receive a portion of the first member.

In another general aspect, the present disclosure is directed, in part, to a connector assembly for a flow restricting apparatus. In one embodiment, the connector assembly comprises a first member configured to be engaged with the flow restricting apparatus and a second member configured to be engaged with an outlet conduit. The first member comprises a first face, a second face, a bore defined through the first member, and a groove defined in the second face. The groove at least partially surrounds the bore. The second member comprises a bore defined through the second member and at least one projection extending outwardly from the second member. The projection forms a receiving portion. The first member is configured to be at least partially positioned within the receiving portion when engaged with the second member to form a connection between the first member and the second member. The connector assembly may facilitate connection of the flow restricting apparatus to the outlet conduit by lowering or otherwise positioning the flow restricting apparatus so that the first and second members engagedly connect in a fluid-tight, or substantially fluid-tight, manner.

BRIEF DESCRIPTION OF THE DRAWINGS

The embodiments described herein will become more apparent and will be better understood by reference to the following description of non-limiting embodiments of the disclosure taken in conjunction with the accompanying drawings, wherein.

DETAILED DESCRIPTION

Various non-limiting embodiments of the present disclosure will now be described to provide an overall understanding of the principles of the structure, function, manufacture, and use of the flow restricting apparatuses and connector assemblies for the same disclosed herein. One or more examples of these non-limiting embodiments are illustrated in the accompanying drawings. It will be appreciated that the flow restricting apparatuses and the connector assemblies for the same specifically described herein and illustrated in the accompanying drawings are non-limiting example embodiments and that the scope of the various non-limiting embodiments of the present disclosure are defined solely by the claims. The features illustrated or described in connection with one non-limiting embodiment may be combined with the features of other non-limiting embodiments. Such modifications and variations are intended to be included within the scope of the present disclosure.

Figure 1:
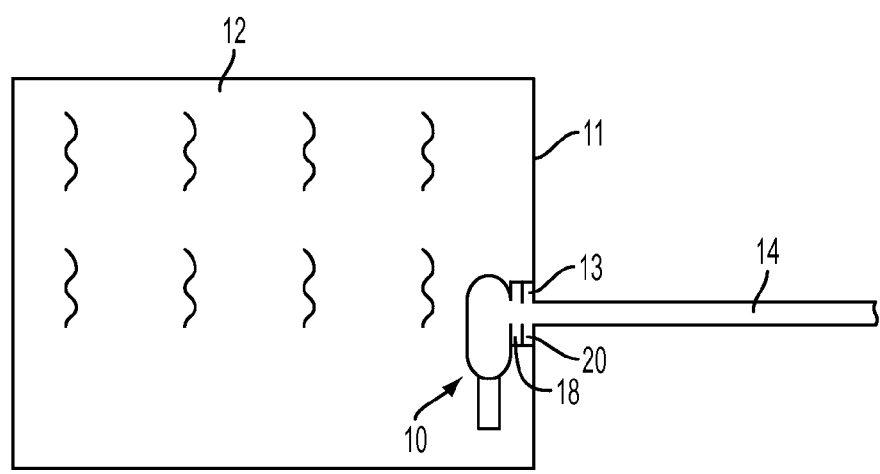
FIG. 1 is a simplified schematic illustration of flow restricting apparatus attached to a connector assembly in accordance with one non-limiting embodiment.
Figure 2:
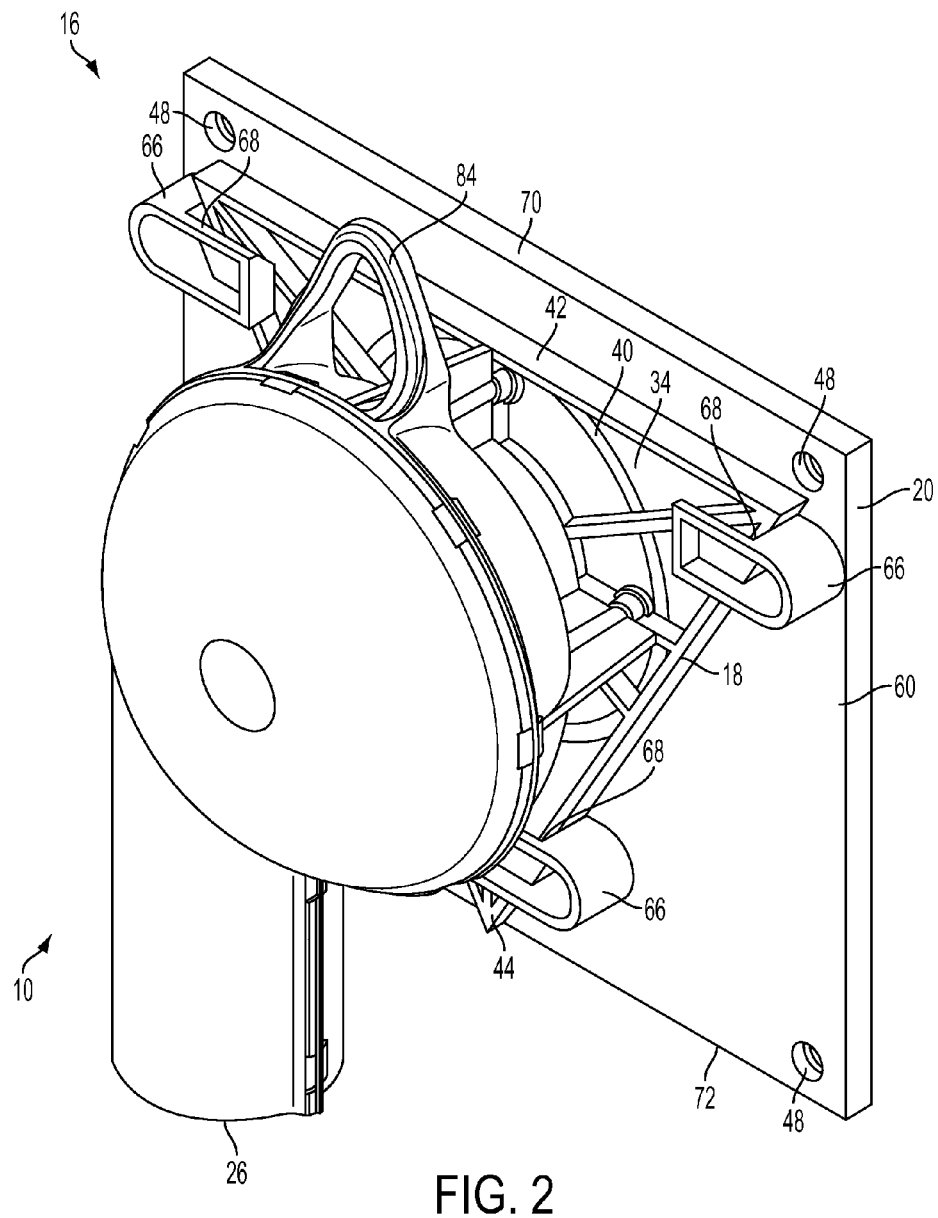
FIG. 2 is a front perspective view of a flow restricting apparatus attached to a connector assembly in accordance with one non-limiting embodiment.
Figure 3:
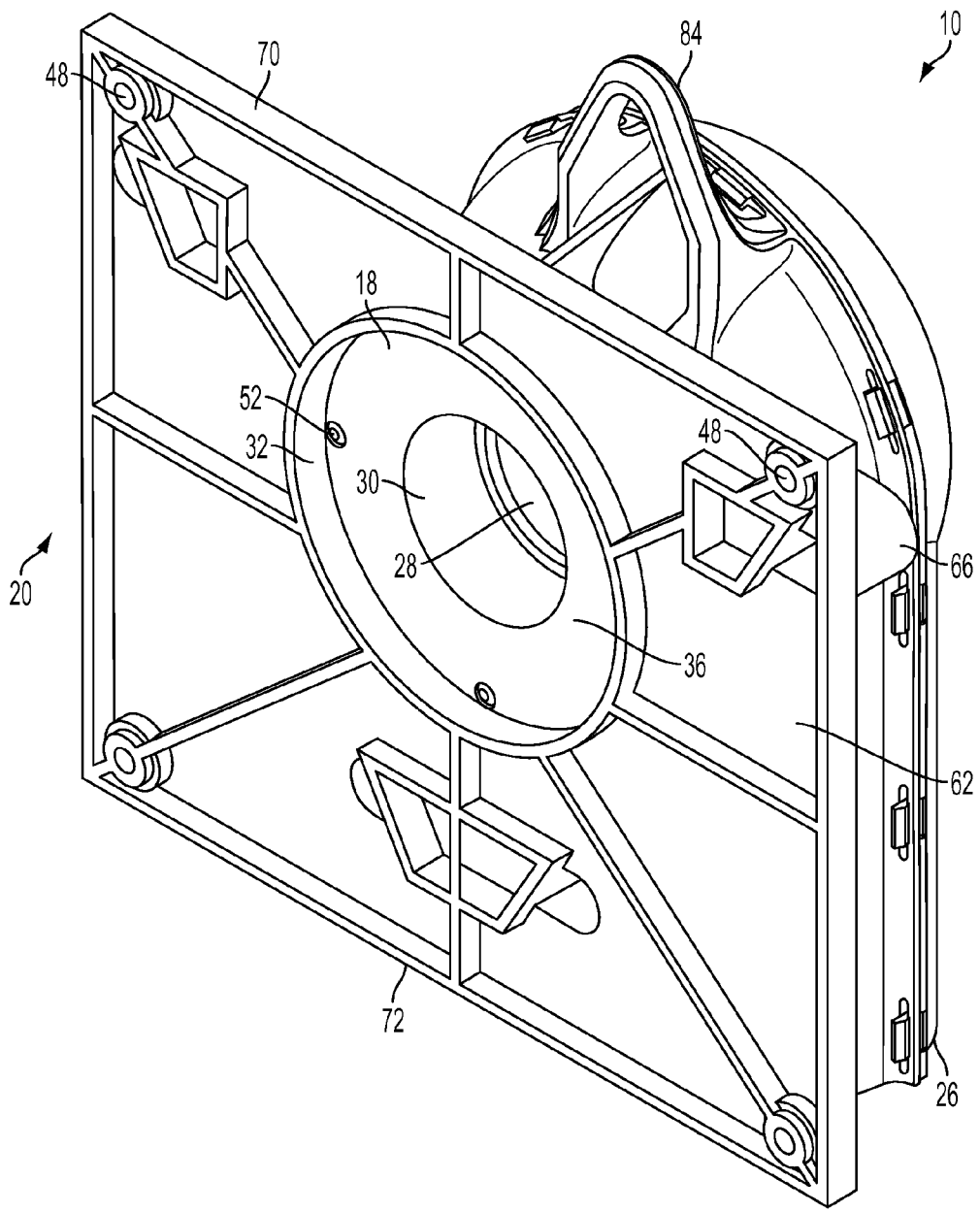
FIG. 3 is a rear perspective view of the flow restricting apparatus attached to the connector assembly of FIG. 2 in accordance with one non-limiting embodiment.

In one embodiment, referring to FIG. 1, a flow restricting apparatus or a fluid flow restricting apparatus, such as vortex valve 10, for example, can be used to restrict or slow fluid flow from a reservoir 12 or a drainage gully to an outlet conduit or pipe 14. Although a "vortex valve" is referred to herein, the present disclosure contemplates multiple flow restricting apparatuses or fluid flow restricting apparatuses other than vortex valves, as described in greater detail below. The vortex valve 10 can allow flow therethrough under normal conditions and can create an air vortex therein during high flow conditions to slow or restrict the flow of fluid from the reservoir 12 or the drainage gully into the outlet conduit 14. Such a feature can help protect equipment positioned downstream of the vortex valve 10 from flooding during periods of heavy rainfall or runoff, for example. In one embodiment, the fluid restricted by the vortex valve 10 can be water, such as storm water, for example.

In various embodiments, referring to FIGS. 1-11, the vortex valve 10 can be operatively and/or fluidly associated with the outlet conduit 14 using a connector assembly 16. In one embodiment, the connector assembly 16 can comprise a first member 18 and a second member 20. The second member 20 can receive, be engaged with, and/or be sealably coupled to an end portion of the outlet conduit 14. In one embodiment, a gasket (not illustrated) or other suitable sealing member can be positioned intermediate the second member 20 and the end portion of the outlet conduit 14 to create a fluid-tight, or substantially fluid-tight, connection between the second member 20 and the end portion of the outlet conduit 14. The end portion of the outlet conduit 14 can be engaged with the second member 20 using fasteners, such as anchor bolts, for example. In other embodiments, the second member 20 can be connected to the outlet conduit 14 using other suitable fastening devices or methods known to those of skill in the art. The first member 18 can be engaged with the vortex valve 10. In such an embodiment, fluid from the reservoir 12 or the drainage gully can flow into an inlet 26 of the vortex valve 10, flow through the vortex valve 10, flow through an outlet 28 of the vortex valve 10, flow through a bore 30 in the first member 18, flow through a bore 32 in the second member 20, and flow into the outlet conduit 14. Such a flow sequence can occur independent of whether an air vortex is created within the vortex valve 10. In various embodiments, when assembled, the outlet 28, the bore 30, the bore 32, and an opening in the end portion of the outlet conduit 14 can be in fluid communication or sealed fluid communication, such that the fluid in the reservoir 12 or the drainage gully can flow into the outlet conduit 14. In various embodiments, the vortex valve 10 and the first member 18 can be removably attached to the second member 20 for cleaning of the vortex valve 10, or maintenance to the vortex valve 10, for example. The bores 30, 32 can be the same size (e.g., same radii if the bores are circular) or they can be different sizes. For example, the bore 30 of the first member 18 can be size smaller (e.g., a lesser radius) than the bore 32 of the second member 20. In various embodiments, the size of the bores 30 and 32 can be changed during manufacturing to modify the flow rate of fluid through the connector assembly 16. In one embodiment, if the bores 30 and 32 are larger the flow rate of fluid through the connector assembly 16 can be greater.

In one embodiment, referring to FIG. 1, the reservoir 12 can comprise a side wall 11 having an aperture therein. The aperture in the side wall 11 can receive a portion of the outlet conduit 14 therethrough. The second member 20 can be bolted or otherwise fastened to the side wall 11 over the aperture in the side wall 11. In various embodiments, a gasket 13 can be positioned intermediate the side wall 11 and the second member 20 such that a fluid-tight, or substantially fluid-tight, seal can be made between the second member 20 and the side wall 11.

In one embodiment, referring to FIGS. 2, 3, and 5-13, the first member 18 can comprise a first face 34 and a second face 36. The bore 30 can be defined through the first member 18 at least intermediate the first face 34 and the second face 36. An annular flange or projection 38, or an otherwise shaped flange or projection, can extend from the first face 34 and can be configured to be positioned against, in fluid communication with, about, proximate to, and/or adjacent to at least a portion of the outlet 28 of the vortex valve 10. In one embodiment, a portion of the bore 30 can be defined by the annular flange 38. In various embodiments, a groove 40 can be defined in the second face 36 and the groove 40 can at least partially surround the bore 30 or can fully surround the bore 30. In one embodiment, the groove 40 can comprise an arcuate portion and can have a circular-shaped perimeter. In other embodiments, the groove 40 can comprise a square-shaped perimeter, a rectangular-shaped perimeter, a triangular-shaped perimeter, an ovate-shaped perimeter, and/or any other suitably shaped perimeter. In various embodiments, the first member 18 may not comprise the groove 40 and can comprise other suitable sealing members or materials, such as a gasket, for example. In one embodiment, the first member 18 can comprise a raised lip (not illustrated) extending from the second face 36. The raised lip in the second face 36 of the first member 18 can be provided with or without the groove 40. In one embodiment, both the raised lip and the groove 40 can be used to seal the first member 18 to the second member 20. Other suitable sealing members, such as gaskets or materials, for example, can be used intermediate the various components of the connector assembly 16 as will be recognized by those of skill in the art.

In one embodiment, the first member 18 can comprise an outer edge 42 defining the perimeter of the first member 18. In various embodiments, the outer edge 42 can have a triangular shape, a circular shape, a semi-circular shape, a trapezoidal shape, a truncated trapezoidal shape, a rectangular shape, a square shape, an ovate shape, and/or any other suitable shape. In any event, the outer edge 42 can have a shape configured to at least partially fit within one or more projections or one or more receiving portions on the second member 20. In one embodiment, the first member 18 can comprise one or more tapered or angled portions 44 to aid the engagement of the first member 18 with the second member 20 and/or the engagement of the first member 18 with one or more projections or one or more receiving portions on the second member 20. In other various embodiments, the entire first member 18 can be tapered such that the first member 18 can act as a type of wedge when engaged with the one or more projections or the receiving portions on the second member 20. In one embodiment, the tapered or angled portion 44 can be situated proximate to a point of a triangular first member 18, for example. In such an embodiment, the distance between the first face 34 and the second face 36 at one end of the first member 18 can be greater than the distance between the first face 34 and the second face 36 at the other end of the first member 18. In one embodiment, the tapered portion 44 can be formed in the first face 34 and/or the second face 36.

In various embodiments, the first member 18 can comprise one or more apertures 46 configured to each receive portions of a connection member 52, such as a screw or a bolt, for example, such that the first member 18 can be attached to the vortex valve 10. The vortex valve 10 can comprise apertures 80 configured to receive portions of the connection members 52 therein. The apertures 80 can be positioned on the vortex valve 10 proximate to or about the outlet 28, for example. In one embodiment, the connection members 52 can be threaded and side walls of the apertures 46 and the apertures 80 can comprise threads, for example. As a result, the connection members 52 can be threadably engaged with portions of the apertures 46 and portions of the apertures 80 to affix the first member 18 to the vortex valve 10. In one embodiment, a sealing member or material can be positioned intermediate the first member 18 and the vortex valve 10 to ensure a fluid-tight, or substantially fluid-tight, connection between the first member 18 and the vortex valve 10.

In one embodiment, referring to FIGS. 2, 3, 5-11, 14, and 15, the second member 20 can comprise a first side 60 and a second side 62. The bore 32 of the second member 20 can be defined through the second member 20 intermediate the first side 60 and the second side 62. The bore 32 can be configured to at least partially or fully align with the bore 30 of the first member 18 when the first member 18 is engaged with second member 20. Upon engagement of the first member 18 with the second member 20, the second face 36 of the first member 18 can be positioned adjacent to, or in abutting contact with, the first side 60 of the second member 20. In one embodiment, a raised lip 64, protrusion, projection, or other structure can extend from the first side 60. In one embodiment, the raised lip 64 can comprise an arcuate portion and can comprise a circular-shaped perimeter. In other embodiments, the raised lip 64 can comprise a perimeter, shape, and/or configuration configured to engage the groove in the first member 18. The raised lip 64 can at least partially or fully surround the bore 32. In one embodiment, the raised lip 64 can be configured to sealingly engage the groove 40 when the first member 18 is engaged with the second member 20. In various embodiments, portions of the raised lip 64 and/or portions of the groove 40 can comprise a sealing substance or member, for example. In other various embodiments, the seal between the raised lip 64 and the groove 40 can be made without a sealing substance or member. In an embodiment in which the second face 36 of the first member 18 comprises a raised lip, the first side 60 of the second member 20 can comprise a groove configured to receive the raised lip, or sealing engage the raised lip, for example. In various embodiments, the raised lip and the groove can be shaped and situated to compliment and/or engage each other when one of the raised lip and the groove is positioned on the first member 18 and one of the raised lip and the groove is positioned on the second member 20. In one embodiment, the second member 20 can comprise the raised lip 64 and the groove, such that the raised lip 64 can be engaged with the groove 40 and the groove can be engaged with the raised lip on the first member 18 when the first member 18 is engaged with or positioned adjacent to the second member 20. In other various embodiments, a sealing member or material can be positioned intermediate the first member 18 and the second member 20, for example.

In one embodiment, referring to FIGS. 2, 3, 7, 8, 10, and 11, for example, the second member 20 can comprise apertures 48. Suitable fasteners can be passed through the apertures 48 to engage the second member 20 with the side wall 11 of the reservoir 12.

In one embodiment, at least one projection 66 can extend outwardly from the first side 60 of the second member 20. The at least one projection 66 can form a receiving portion 68 intermediate a portion of the at least one projection 66 and a portion of the first side 60. When the first member 18 is engaged with the second member 20, the first member 18 can be at least partially guided by the at least one projection 66 during insertion of the first member 18 onto the second member 20 and can be at least partially positioned within the receiving portion 68 when engaged with the second member 20 to form a connection or an engagement between the first member 18 and the second member 20. In one embodiment, portions of the outer edge 42 of the first member 18 can be at least partially engaged with the receiving portion 68 when the first member 18 is engaged with the second member 20.

In one embodiment, the at least one projection 66 can comprise a first projection, a second projection, and a third projection. The second member 20 can comprise a top edge 70 and a bottom edge 72. The first projection and the second projection can be positioned proximate to the top edge 70, and the third projection can be positioned proximate to the bottom edge 72, or proximate to a midpoint of the bottom edge 72. In one embodiment, the number of projections on the second member 20 can vary, as will be recognized by those of skill in the art. For example, four or more projections can be used. In an embodiment where only one projection is used, that projection can comprise an arcuately-shaped receiving portion, a truncated oval-shaped receiving portion, a ½ square or rectangular-shaped receiving portion, a truncated trapezoid-shaped receiving portion, a semi-circular-shaped receiving portion, and/or a triangular-shaped receiving portion, for example. Those of ordinary skill in the art will recognize that the perimetrical shape of the first member 18 can drive the shape of the receiving portion of the projection. For example, if the first member comprises a U-shaped perimeter, the second member can comprise a U-shaped receiving portion, such that the first member can be engaged with the second member.

In one embodiment, referring to FIGS. 16-21, another connector assembly 116 for a vortex valve is illustrated. The connector assembly 116 can be similar to the connector assembly 16 described above (like numerals will described like elements), but, in this embodiment, a first member 118 can comprise tapered or angled portions 144 and at least one projection 166 can comprise tapered or angled portions 145 to facilitate engagement of the first member 118 with a second member 120. In one embodiment, the first member 118 can comprise a triangular-shaped perimeter, for example. In various embodiments, a tapered or angled portion 144 can be positioned proximate to each corner of the triangular-shaped first member 118. The tapered or angled portion or portions 144 can be sized and configured to engage the tapered or angled portion or portions 145. The first member 118 can comprise a top edge 121 and a point 123. Tapered or angled portions 144 on the first member 118 can be positioned proximate to each corner of the first portion 118 near the top edge 121 and another tapered or angled portion 144 can be positioned proximate to the point 123. In one embodiment, the second member 120 can comprise a first projection 166, a second projection 166, and a third projection 166. Each of the projections 166 can comprise a receiving portion 168. Each receiving portion 168 can comprise the tapered or angled portion 145. The tapered or angled portions 145 of the second member 120 can be configured to mate with the tapered or angled portions 144 of the first member 118, such that the first member 118 can be essentially wedge-fit or press-fit into the projections 166 of the second member 120 while restricting over insertion of the first member 118. Although a triangular first member 118 and projections 166 on the second member 120 for receiving the same are illustrated, those of skill in the art will recognize that the first member can comprise a different shape and that the projections on the second member can be configured and arranged to receive such a differently shaped first portion.

In various embodiments, still referring to FIGS. 16-21, the tapered or angled portions 144 of the first member 118 and the tapered or angled portions 145 of the second member 120 can each comprise a feature that allows the first member 118 to essentially be removably locked into engagement with the second member 120 when the first member 118 is fully or at least mostly engaged or slidably engaged with the second member 120. Such a feature can also indicate to the installer of the first portion 118 that the first member 118 is fully and/or appropriately engaged with the second member 120. In various embodiments, the first member 118 can be snap-fit with the second member 120 and a "clicking" sound can be heard by the installer when the first member 118 is fully engaged with the second member 120. In one embodiment, one or more of the tapered or angled portions 144 can comprise a recess, for example, and one or more of the tapered or angled portions 145 can comprise a lip. The lip can at least partially engage the recess to removably interlock the first member 118 and the second member 120. In other various embodiments, one or more of the tapered or angled portions 144 can comprise a lip and one or more of the tapered or angled portions 145 can comprise the recess, for example, to accomplish a similar form of engagement between the first portion 118 and the second portion 120. Other suitable methods of removably interlocking the first member 118 and the second member 120 are within the scope of the present disclosure. If the recess and lip described above are provided, a user of the connector assembly 116 can slightly pull apart the first member 118 and the second member 120 to "unlock" the lip from the recess so that the first member 118 and the vortex valve can be removed from the second member 120 for maintenance, for example.

Figure 22:
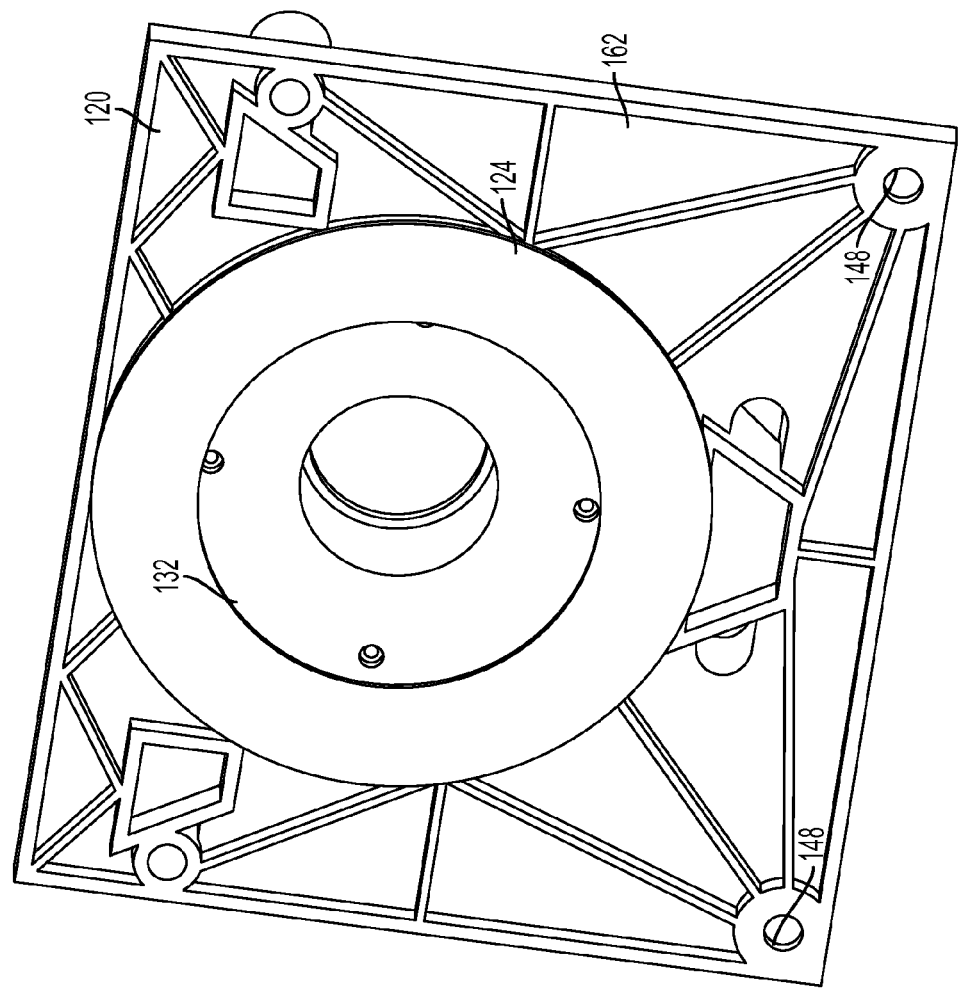
FIGS. 22 and 23 are views of a sealing member positioned on a second member of the connector assembly of FIG. 16 in accordance with various non-limiting embodiments.
Figure 23:
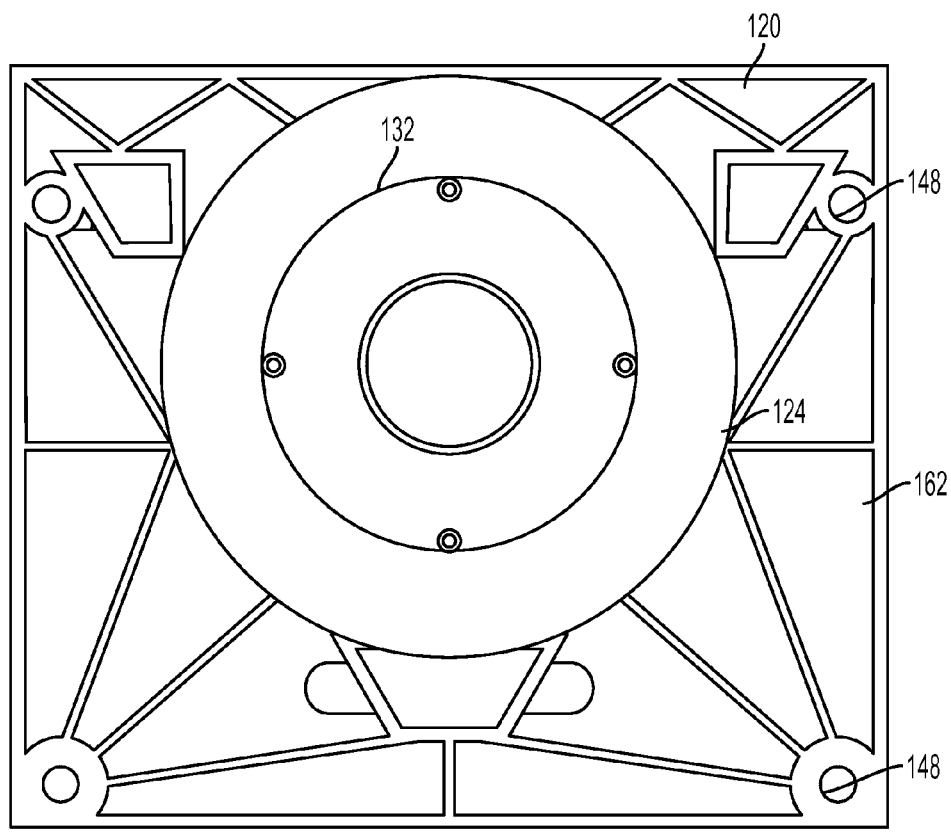
Figure 24:
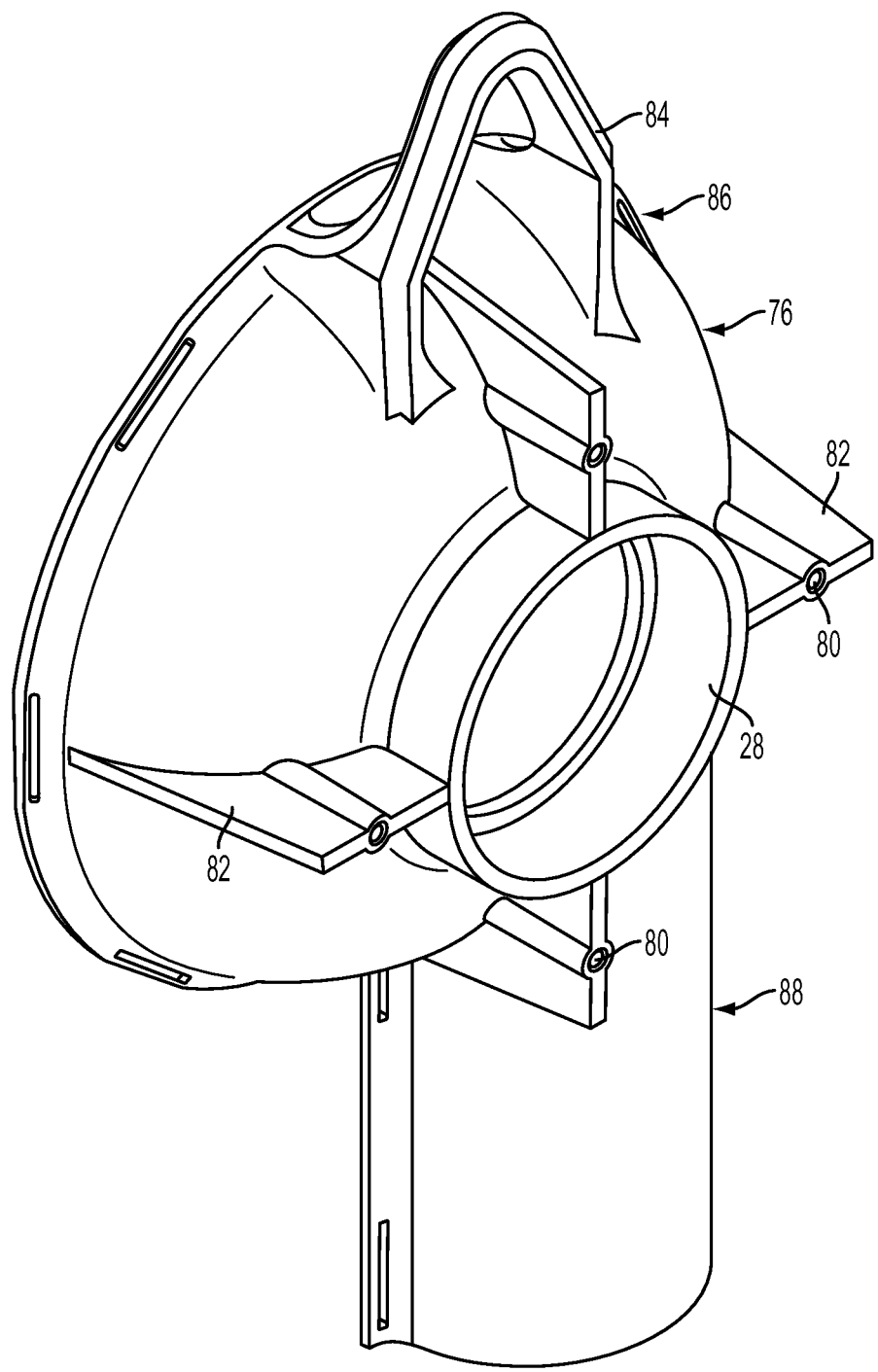
FIG. 24 is a front perspective view of a first portion of a flow restricting apparatus in accordance with one non-limiting embodiment.
Figure 25:
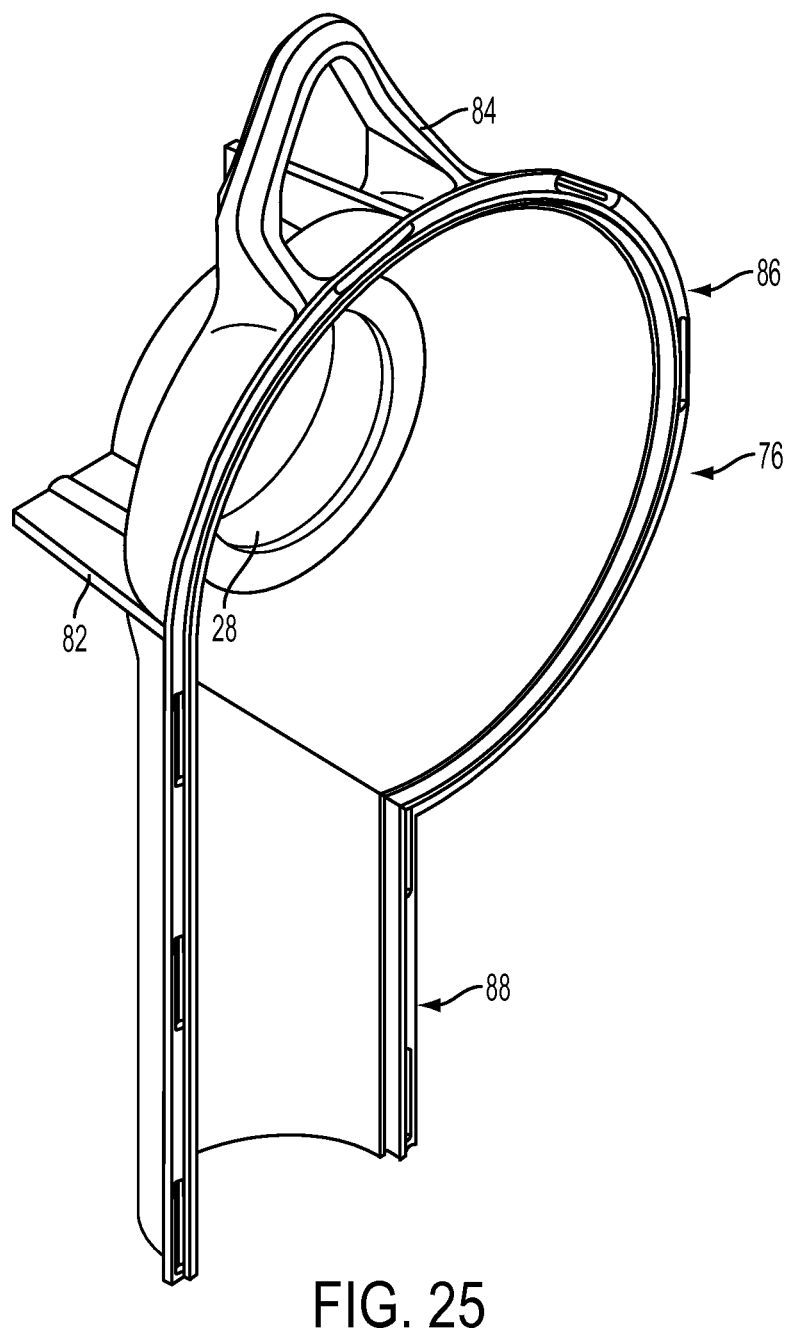
FIG. 25 is a rear perspective view of the first portion of FIG. 24 in accordance with one non-limiting embodiment.

In one embodiment, referring to FIGS. 22 and 23, a gasket 124 is illustrated. In various embodiments, the gasket 124 or another suitable gasket can be used with the connector assembly 16 and/or the connector assembly 116. In one embodiment, the gasket 124 can comprise any suitable sealing member or material, such as a neoprene material, for example. The gasket 124 can be used to create a fluid-tight, or substantially fluid-tight, seal between the second side 162 of the second member 120 and the side wall 11 of the reservoir 12. In one embodiment, the gasket 124 can be positioned around the bore 132, or partially around the bore 132. In other embodiments, the gasket 124 can be positioned around, or partially around, a perimeter of the second side 162 of the second member 120. The gasket 124 can be attached to the second side 162 of the second member 120 using any suitable technique, such as gluing, for example. In other embodiments, the second side 162 can comprise a recess or groove configured to receive the gasket 124.

In one embodiment, referring to FIGS. 24-29, the vortex valve 10 can comprise a first portion 76 and a second portion 78. The first portion 76 can be configured to be attached to the first member 18 using the connection members 52. The first portion 76 can comprise the apertures 80 configured to receive the connection members 52. The first portion 76 can also define the outlet 28 of the vortex valve 10. In one embodiment, the apertures 80 can be positioned around, about, and/or proximate to the outlet 28 such that the annular flange 38 can be placed into fluid communication with the outlet 28 when the first member 18 is engaged with the first portion 76. In various embodiments, the first portion 76 can comprise fins 82 extending therefrom which can form the apertures 80, for example. In one embodiment, the first portion 76 can comprise a handle 84 or grip configured to be used to raise and lower the vortex valve 10 and the first member 18 attached thereon into a position of engagement with the second member 20 within a reservoir, a drainage gully, or other suitable location. In one embodiment, the handle 84 can be positioned on the first member 18 instead of on the first portion 76. The first portion 76 can comprise a dome-shaped portion 86 and an elongate portion 88.

Figure 26:
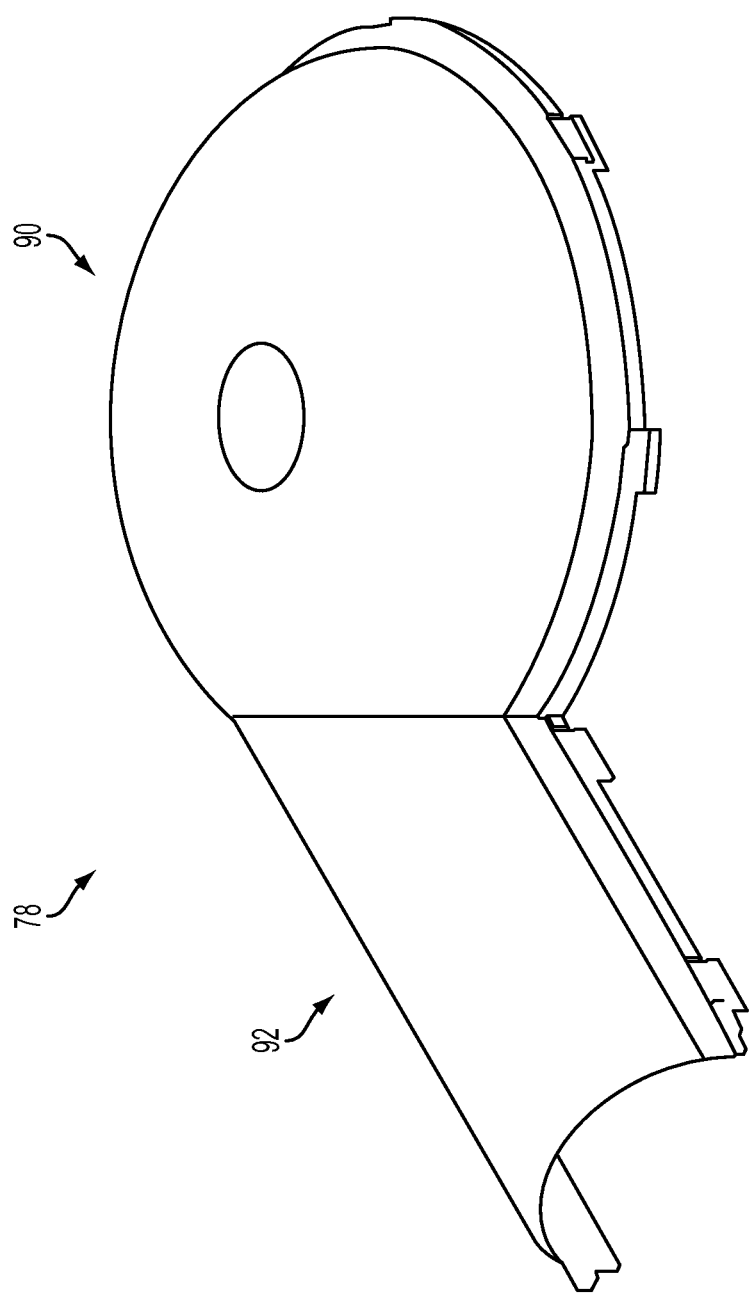
FIG. 26 is a front perspective view of a second portion of a flow restricting apparatus in accordance with one non-limiting embodiment.
Figure 27:
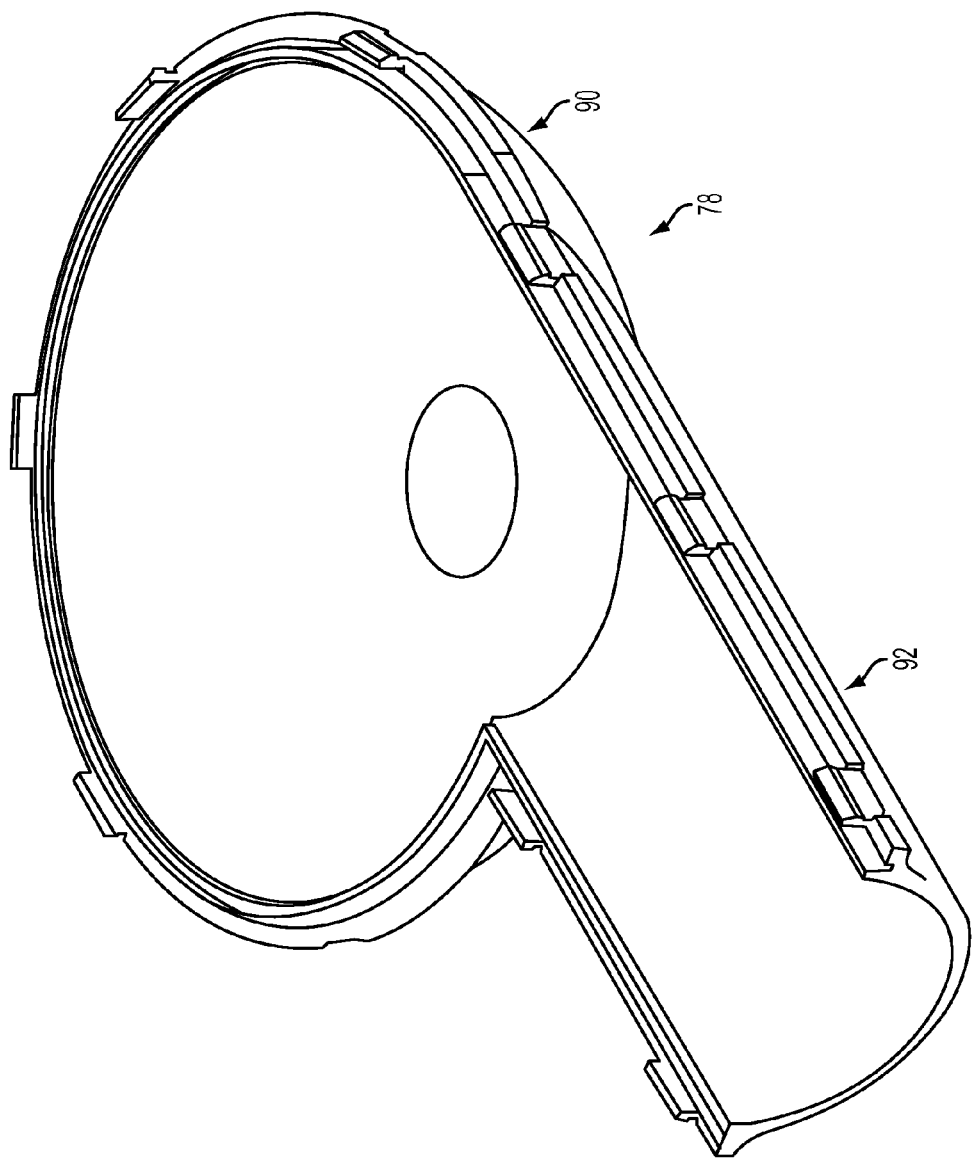
FIG. 27 is a rear perspective view of the second portion of FIG. 26 in accordance with one non-limiting embodiment.

In one embodiment, referring to FIGS. 26 and 27, the second portion 78 can comprise a dome-shaped portion 90 and an elongate portion 92. The dome-shaped portion 90 and the elongate portion 92 can be configured to be engaged with or attached to the dome shaped-portion 86 and the elongate portion 88, respectively, to form the vortex valve 10. In various embodiments, the first portion 76 can be connected to the second portion 78 using any suitable methods, such as snap-fitting, press-fitting, interlocking, gluing, and/or welding, for example. In one embodiment, when the first portion 76 is assembled to the second portion 78, the elongate portions 88 and 92 can define the inlet 26 of the vortex valve 10, while the dome-shaped portions 86 and 90 can define a vortex chamber of the vortex valve 10. In other various embodiments, the vortex valve 10 can be formed of one piece, though injection molding or other suitable process, for example.

Figure 28:
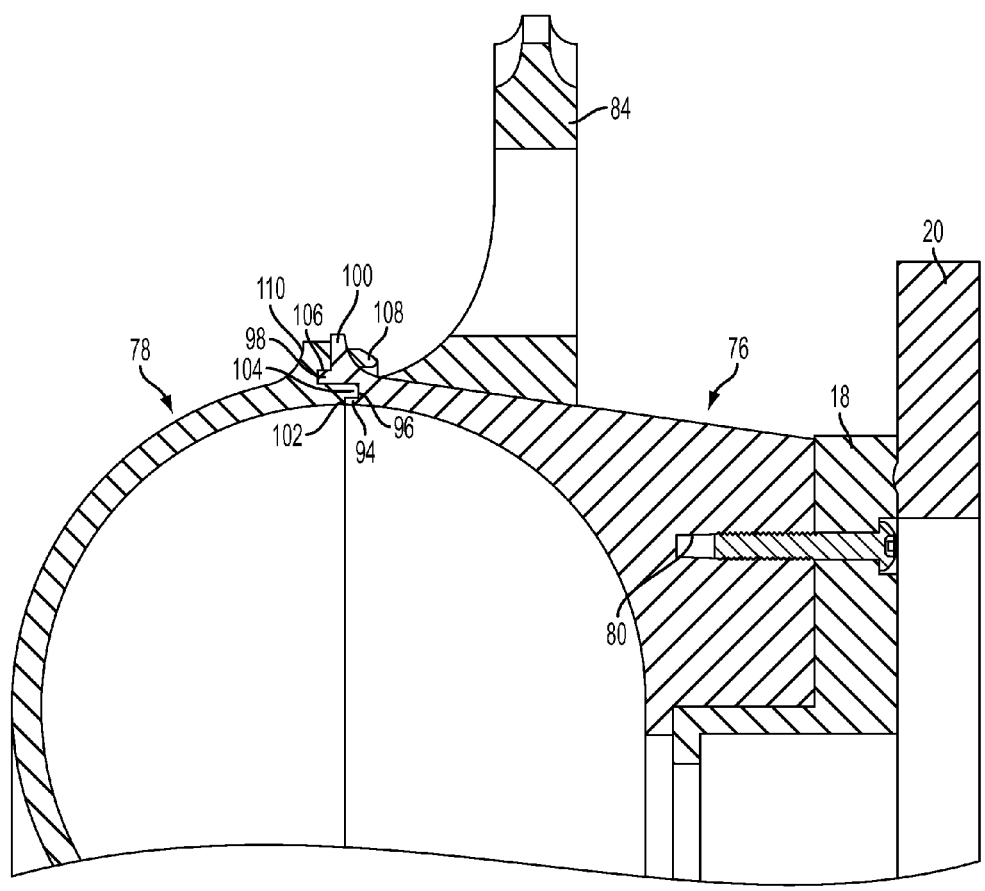
FIGS. 28 and 29 illustrate the connection between a first portion of a flow restricting apparatus and a second portion of the flow restricting apparatus in accordance with one non-limiting embodiment.
Figure 29:
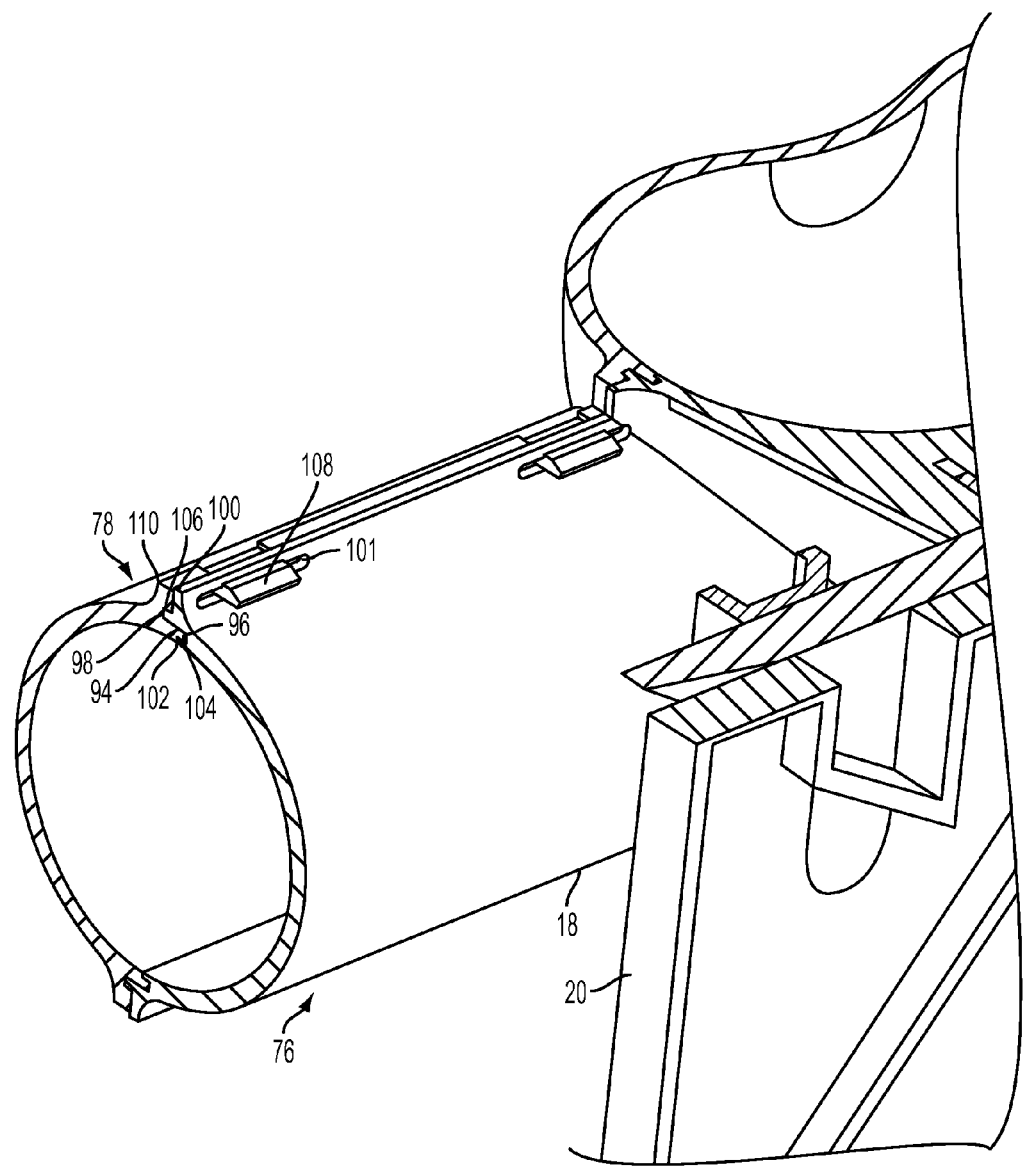
Figure 30:
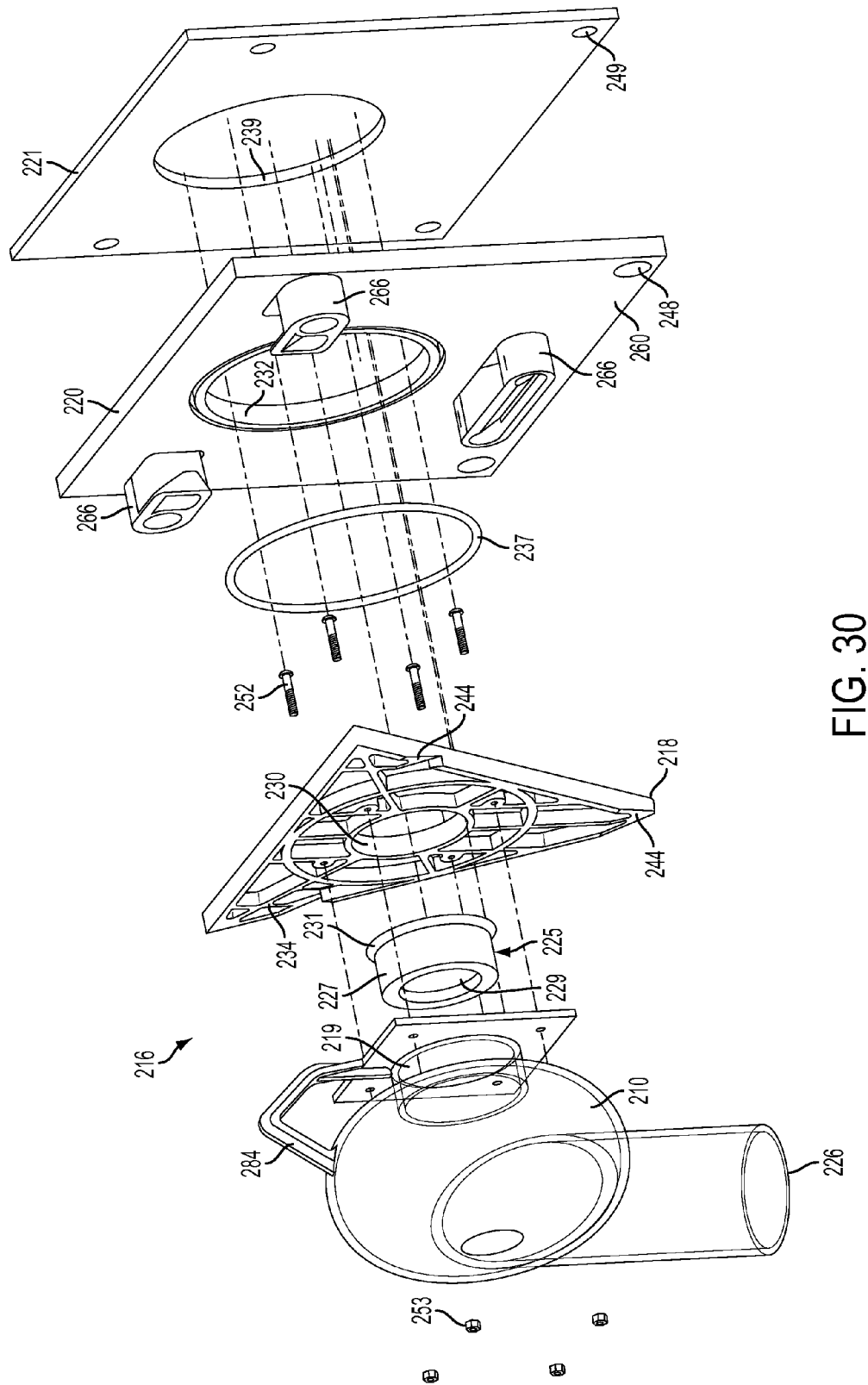
FIG. 30 is an exploded perspective view of a connector assembly for a flow restricting apparatus in accordance with one non-limiting embodiment.
Figure 31:
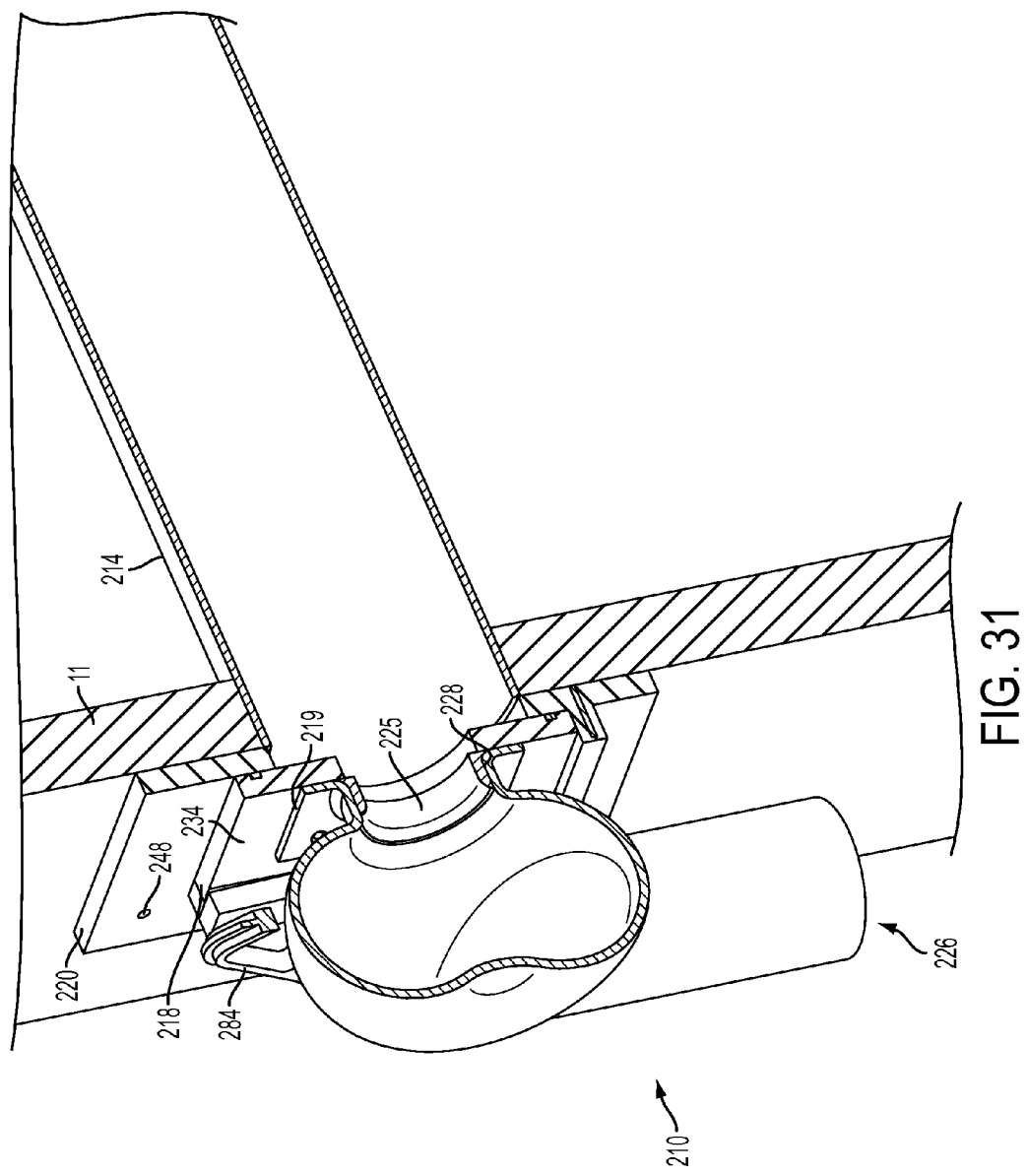
FIG. 31 is a partial cut-away perspective view of the connector assembly of FIG. 30 installed in a reservoir and engaged with an outlet conduit in accordance with one non-limiting embodiment.
Figure 32:
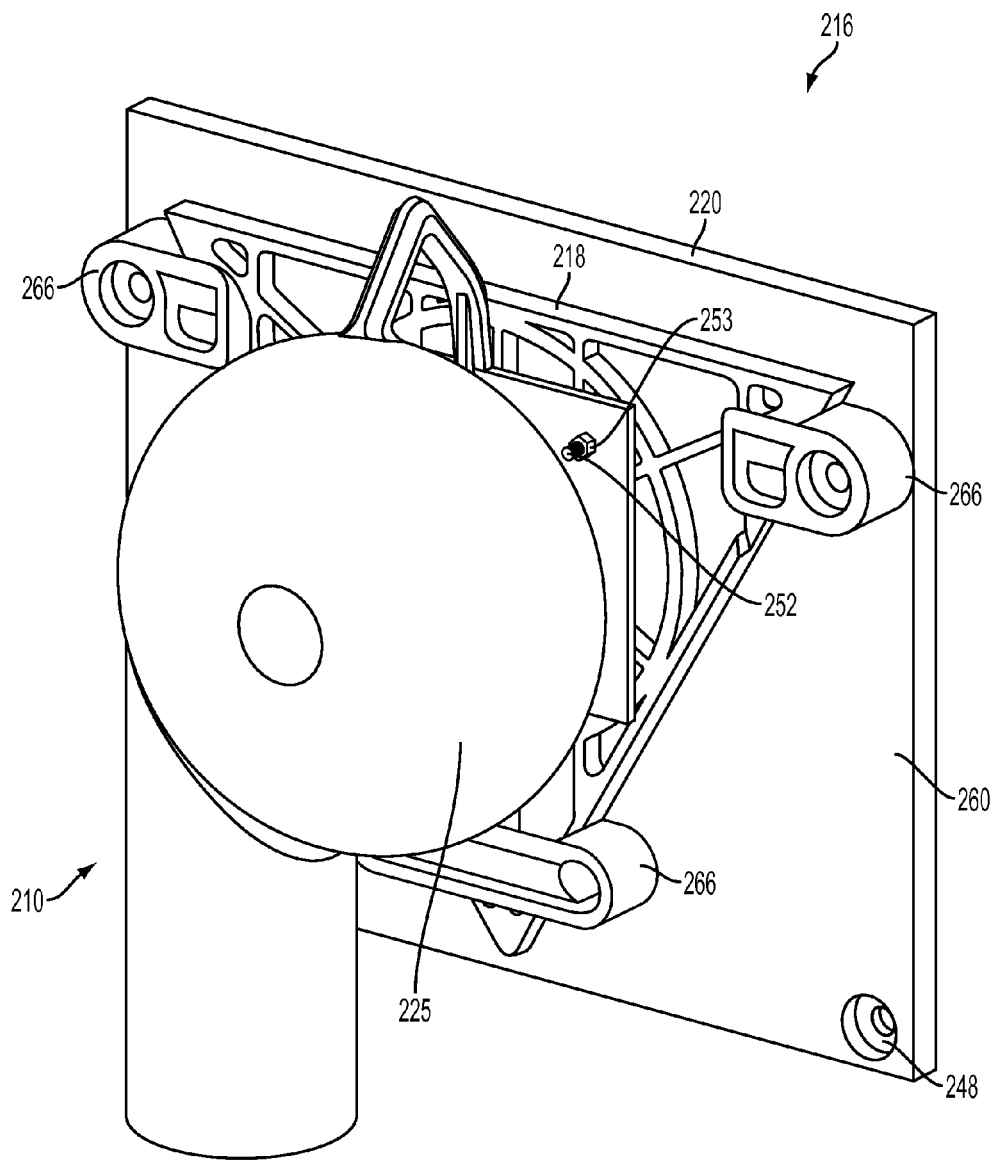
FIG. 32 is an illustrative perspective view of the connector assembly of FIG. 30 in accordance with one non-limiting embodiment.
Figure 33:
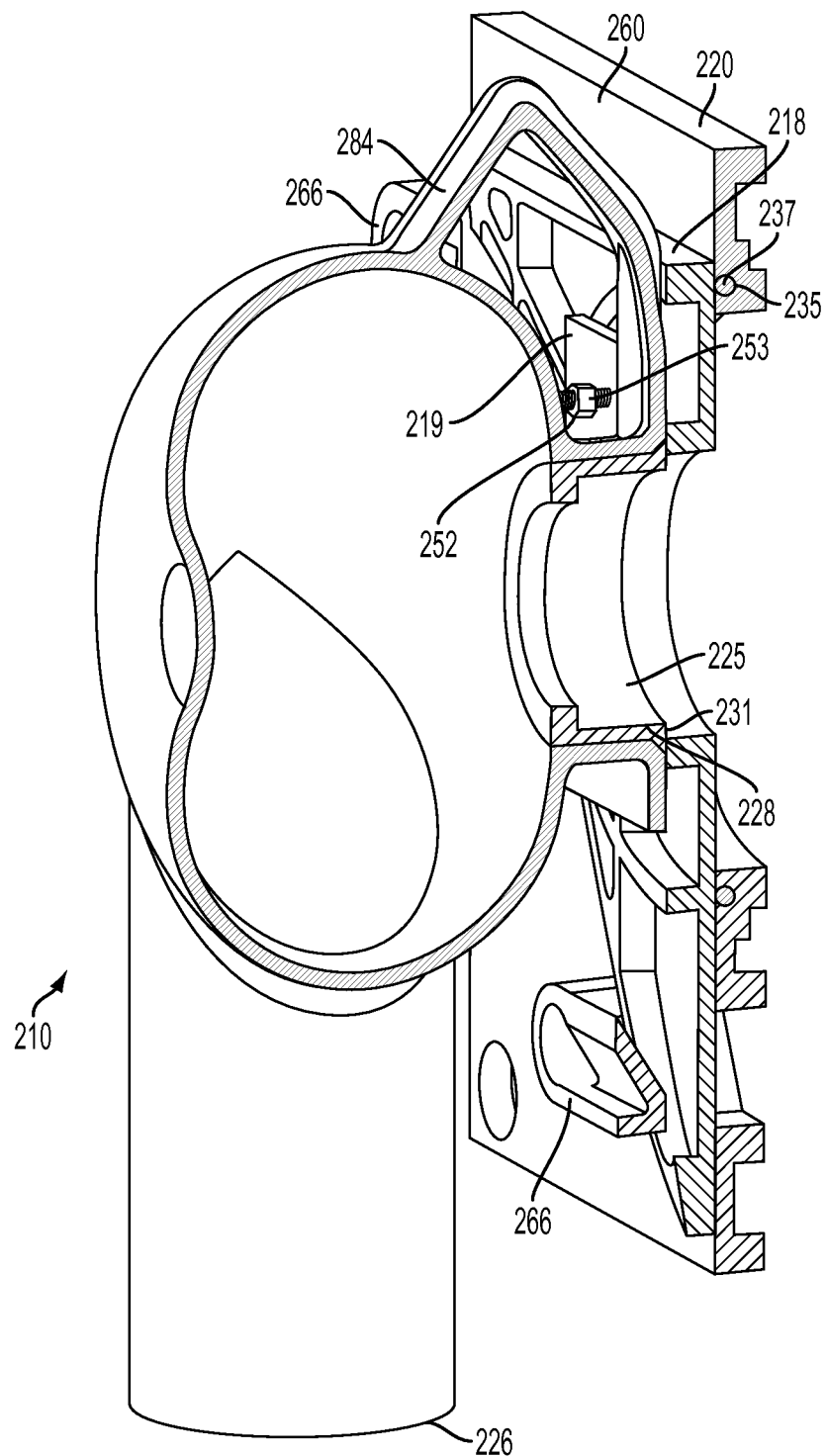
FIG. 33 is a cut-away perspective view of the connector assembly of FIG. 32 in accordance with one non-limiting embodiment.
Figure 34:
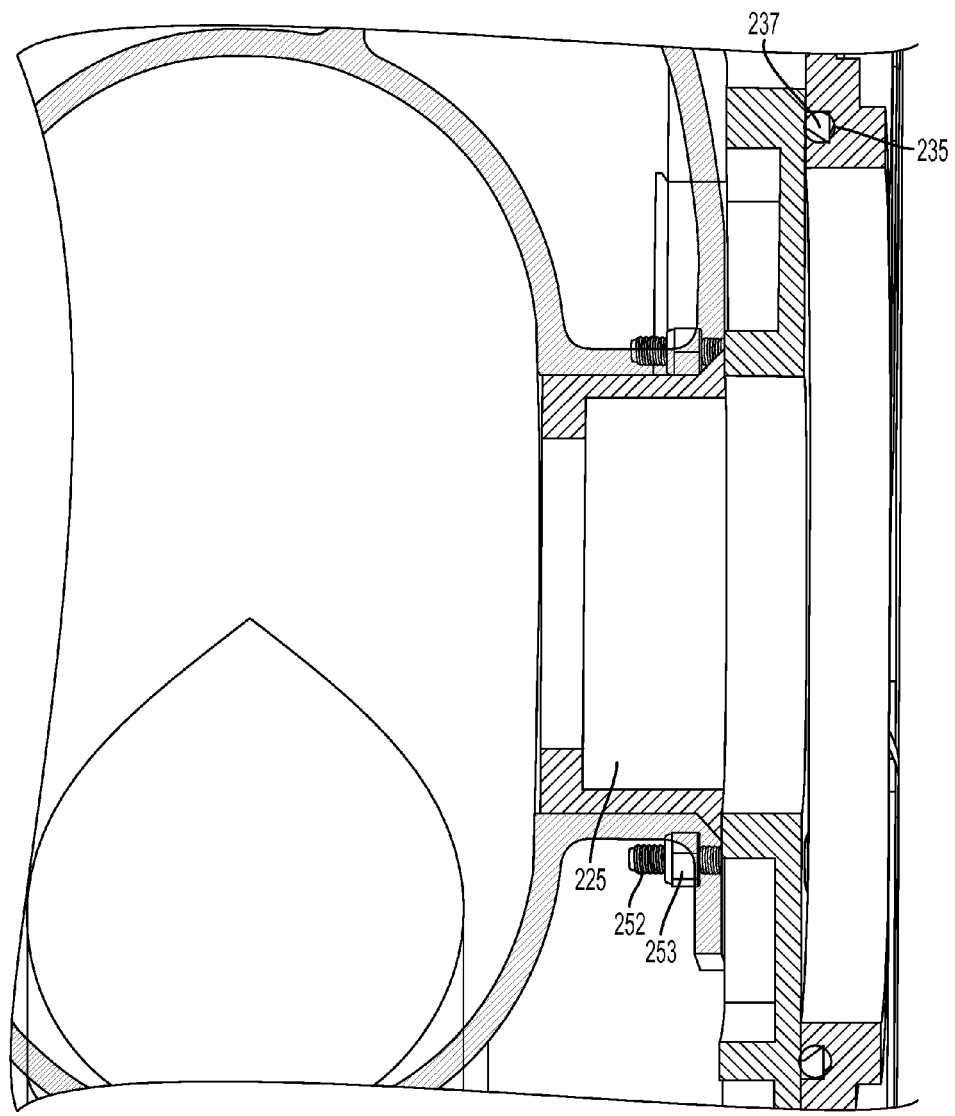
FIG. 34 is a partial cut-away side view of the connector assembly of FIG. 32 in accordance with one non-limiting embodiment.
Figure 35:
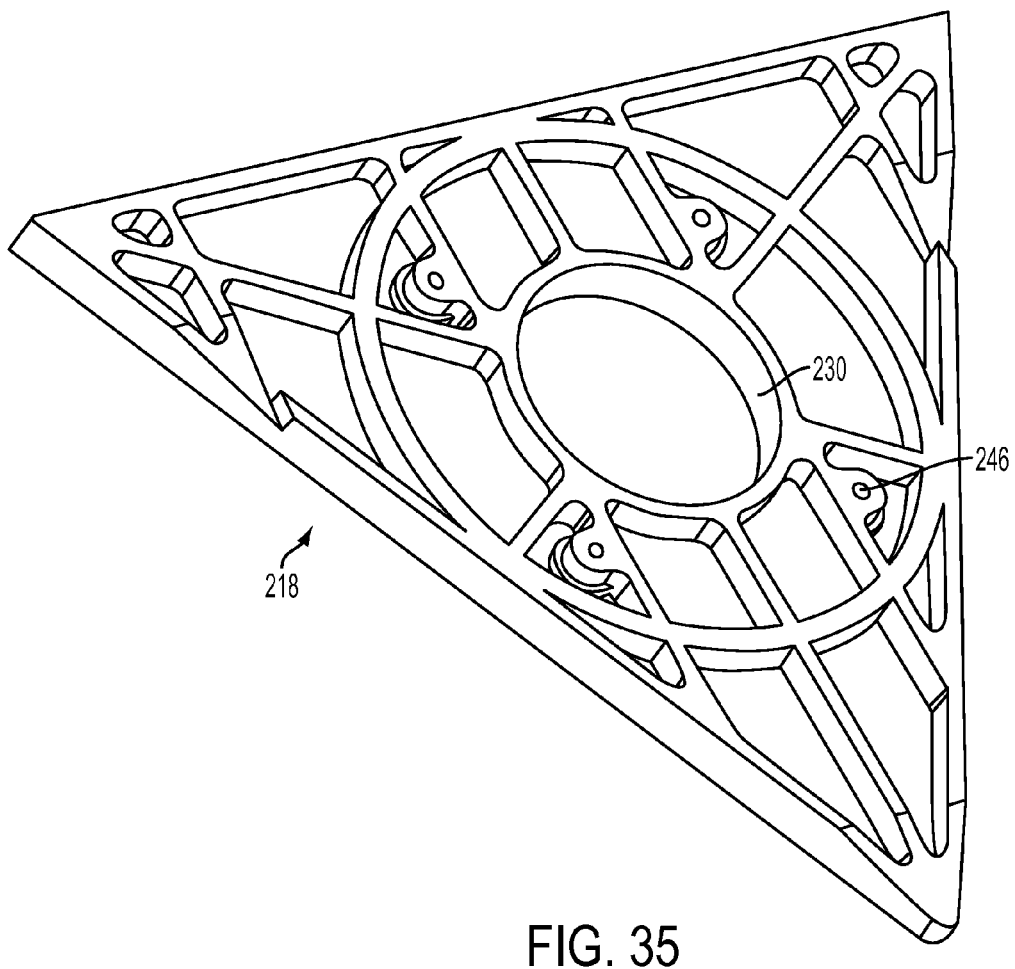
FIG. 35 is a perspective view of a first member of the connector assembly of FIG. 30 in accordance with one non-limiting embodiment.
Figure 36:
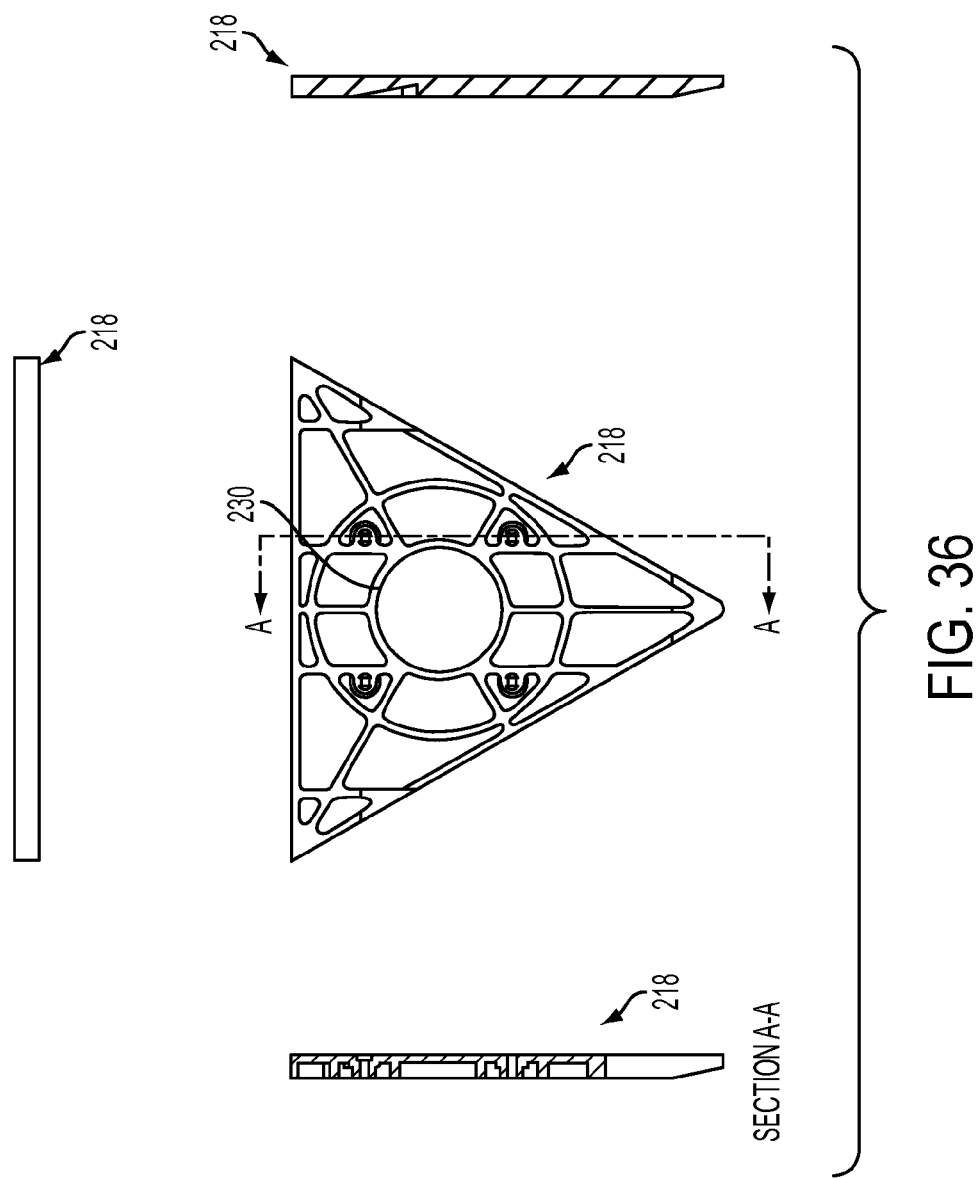
FIGS. 36 and 37 illustrate views of first members of the connector assembly of FIG. 30 in accordance with one non-limiting embodiment.
Figure 37:
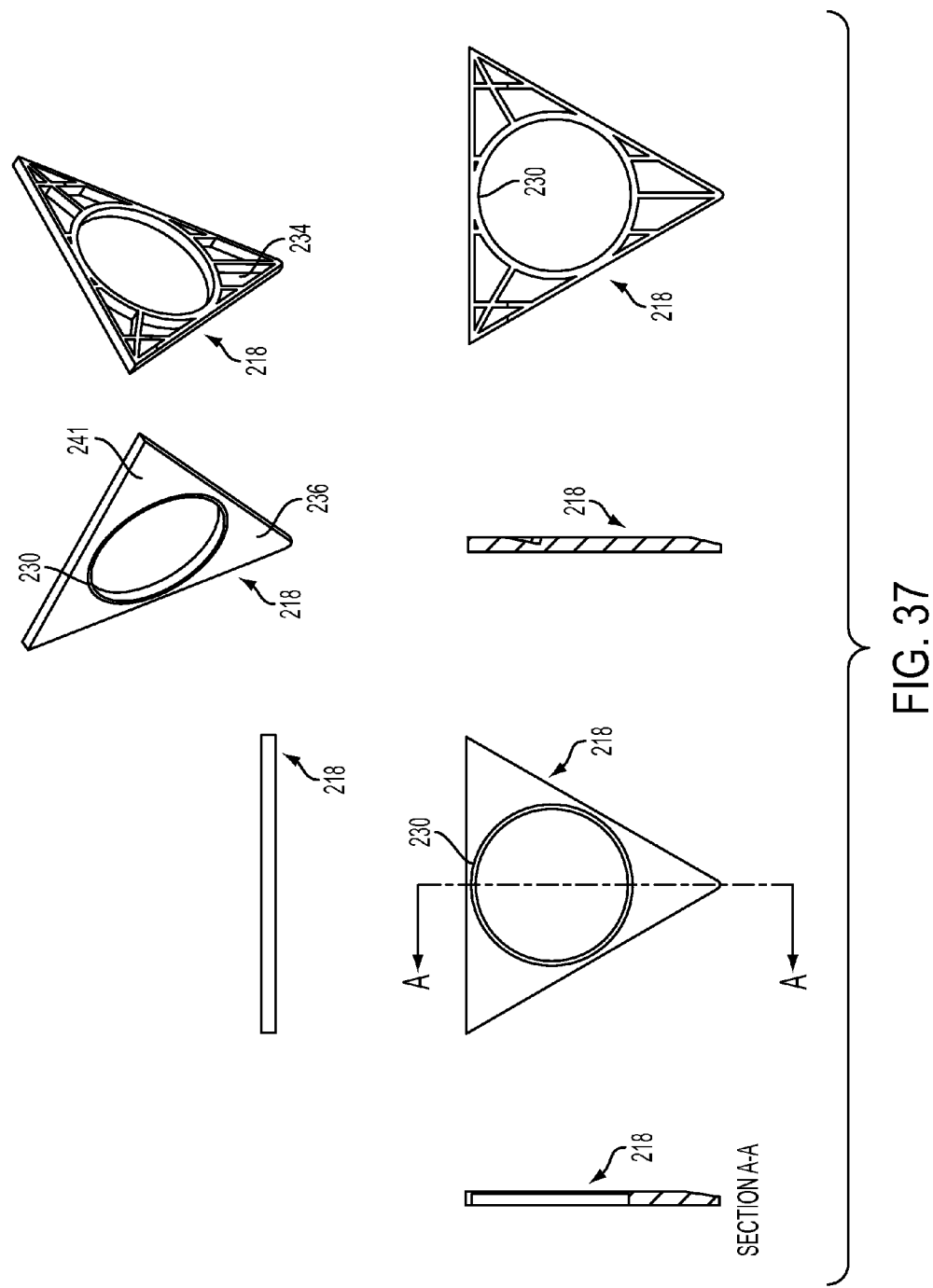
Figure 38:
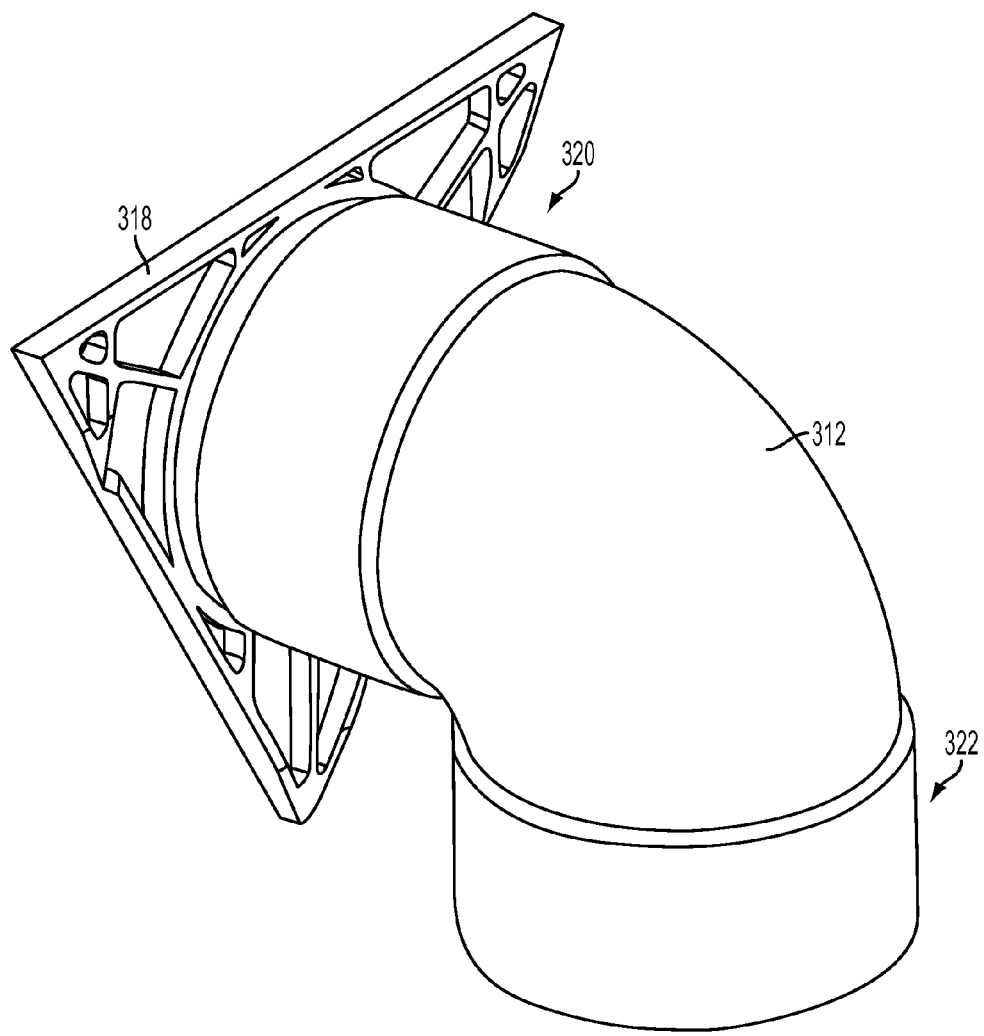
FIG. 38 is a perspective view of a first member attached to a fluid flow restricting assembly in accordance with one non-limiting embodiment.
Figure 39:
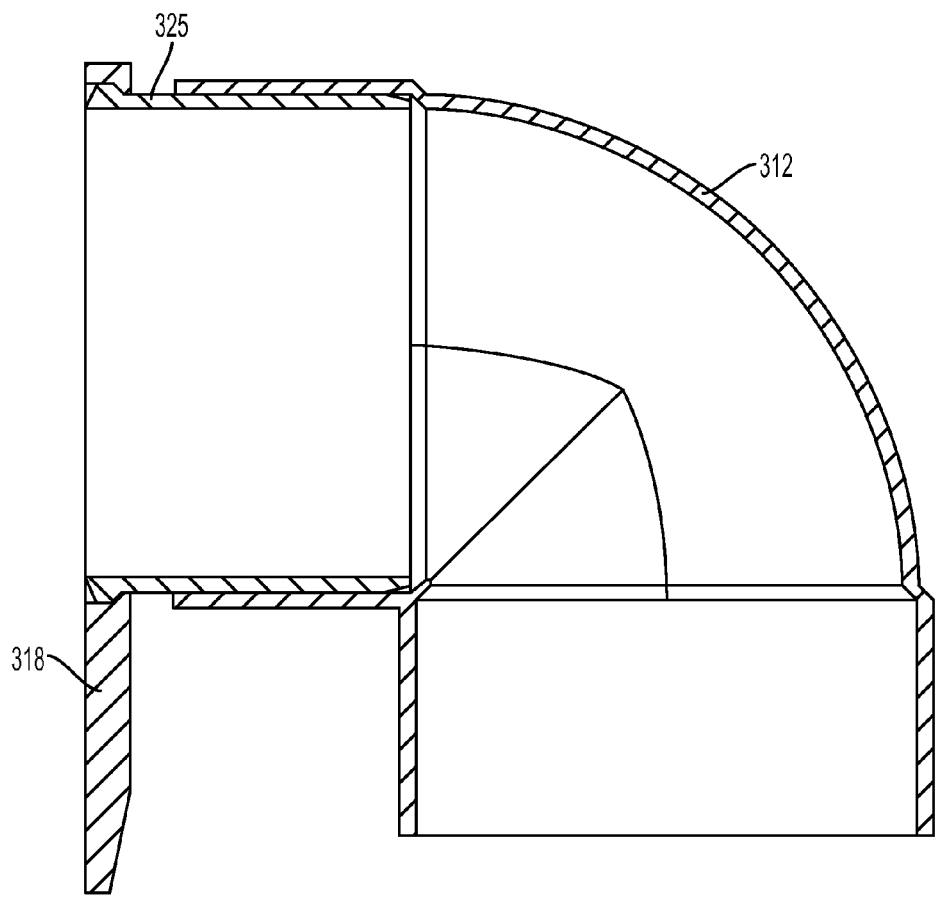
FIG. 39 is a cut-away side view of the first member attached to the flow restricting assembly of FIG. 38 in accordance with one non-limiting embodiment.
Figure 40:
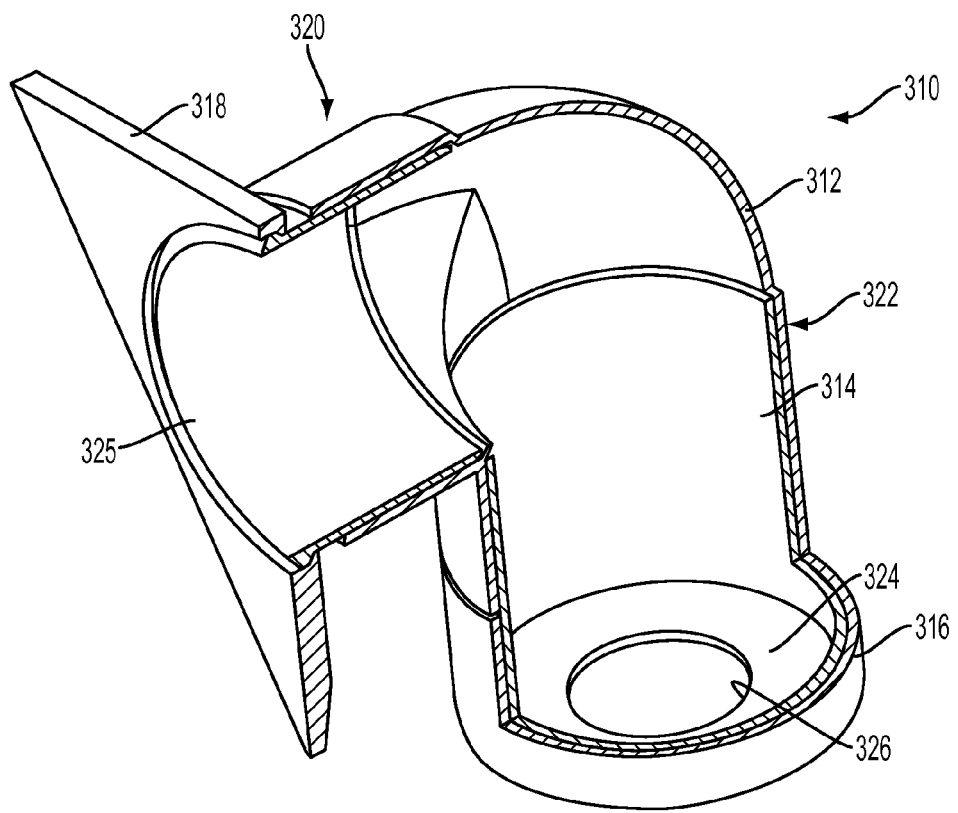
FIG. 40 is a cut-away perspective view of a first member attached to a flow restricting assembly in accordance with one non-limiting embodiment.
Figure 41:
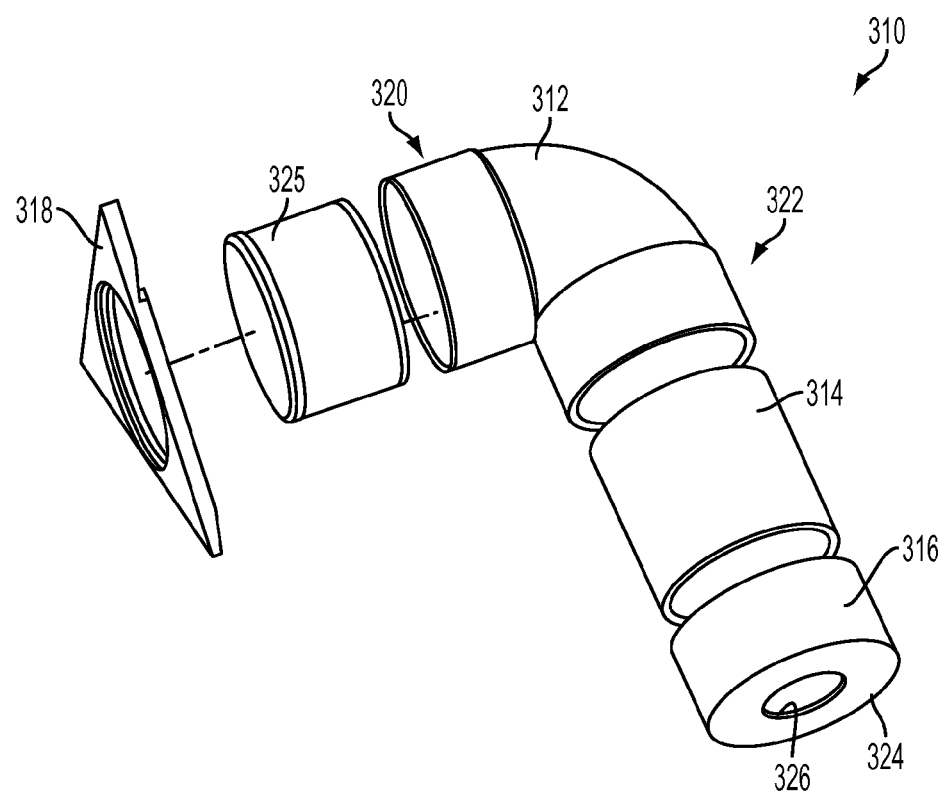
FIG. 41 is an exploded perspective view of the flow restricting assembly and the first member FIG. 40 in accordance with one non-limiting embodiment.

In one embodiment, referring to FIGS. 24-29, and more specifically to FIGS. 28 and 29, the first portion 76 can comprise an edge comprising a first lip 94, a notch 96, a second lip 98, and a flange 100 defining a recess 101. The second portion 78 can comprise and edge comprising a notch 102, a lip 104, a recess 106, and an engagement member 108 defined on a flange 110. When the first portion 76 is engaged with the second portion 78, the above-mentioned features can be engaged as illustrated in FIGS. 28 and 29 to form a fluid-tight seal, or substantially a fluid-tight seal.

Figure 4:
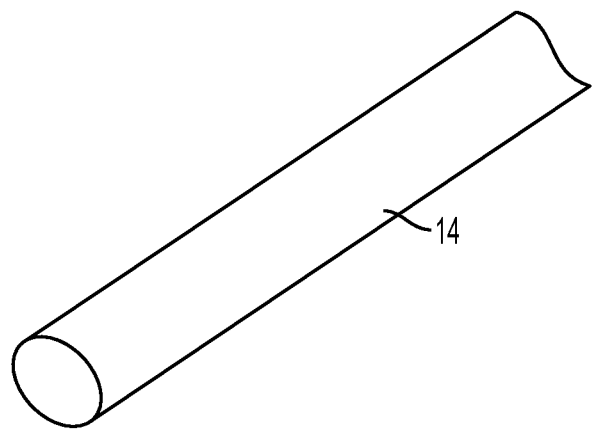
FIG. 4 is a perspective view of an outlet conduit comprising an end in accordance with one non-limiting embodiment.
Figure 5:
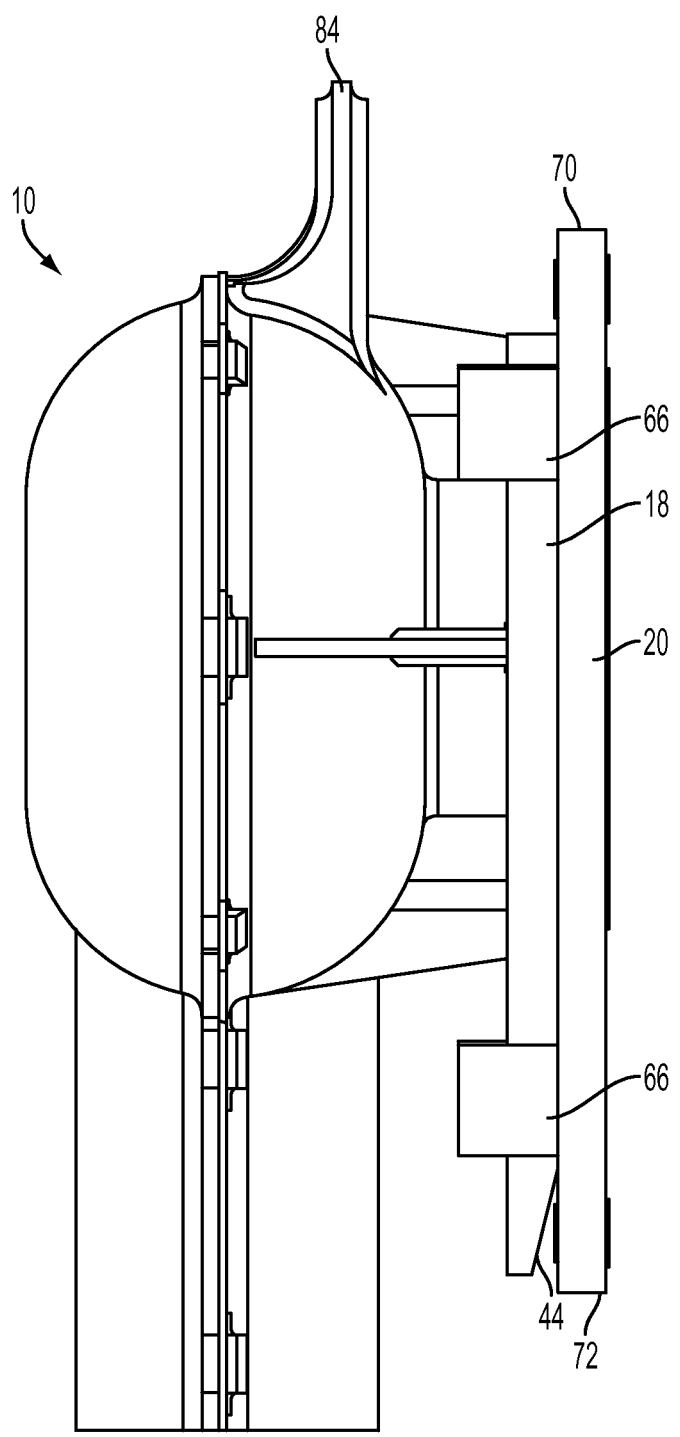
FIG. 5 is a side view of the flow restricting apparatus attached to the connector assembly of FIG. 2 in accordance with one non-limiting embodiment.
Figure 6:
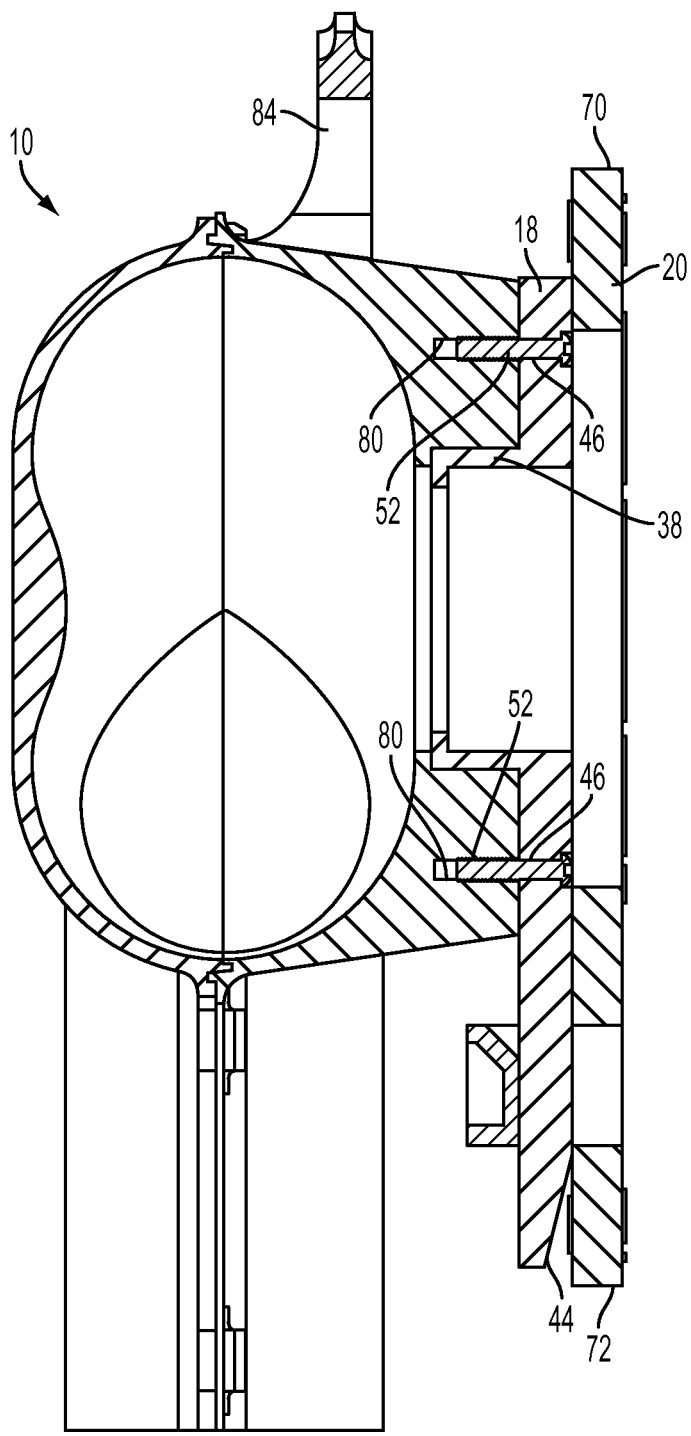
FIG. 6 is a side cut-away view of the flow restricting apparatus attached to the connector assembly of FIG. 2 in accordance with one non-limiting embodiment.
Figure 7:
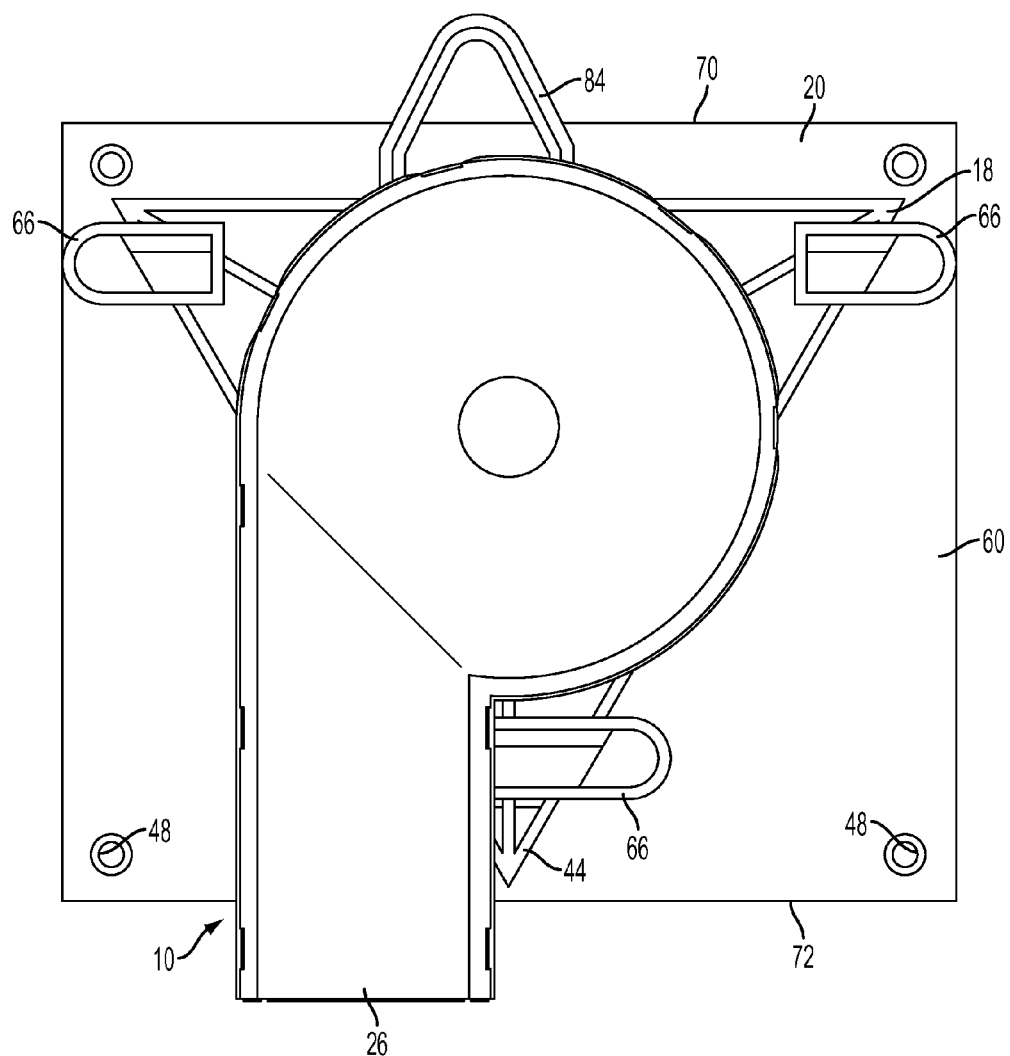
FIG. 7 is a front view of the flow restricting apparatus attached to the connector assembly of FIG. 2 in accordance with one non-limiting embodiment.
Figure 8:
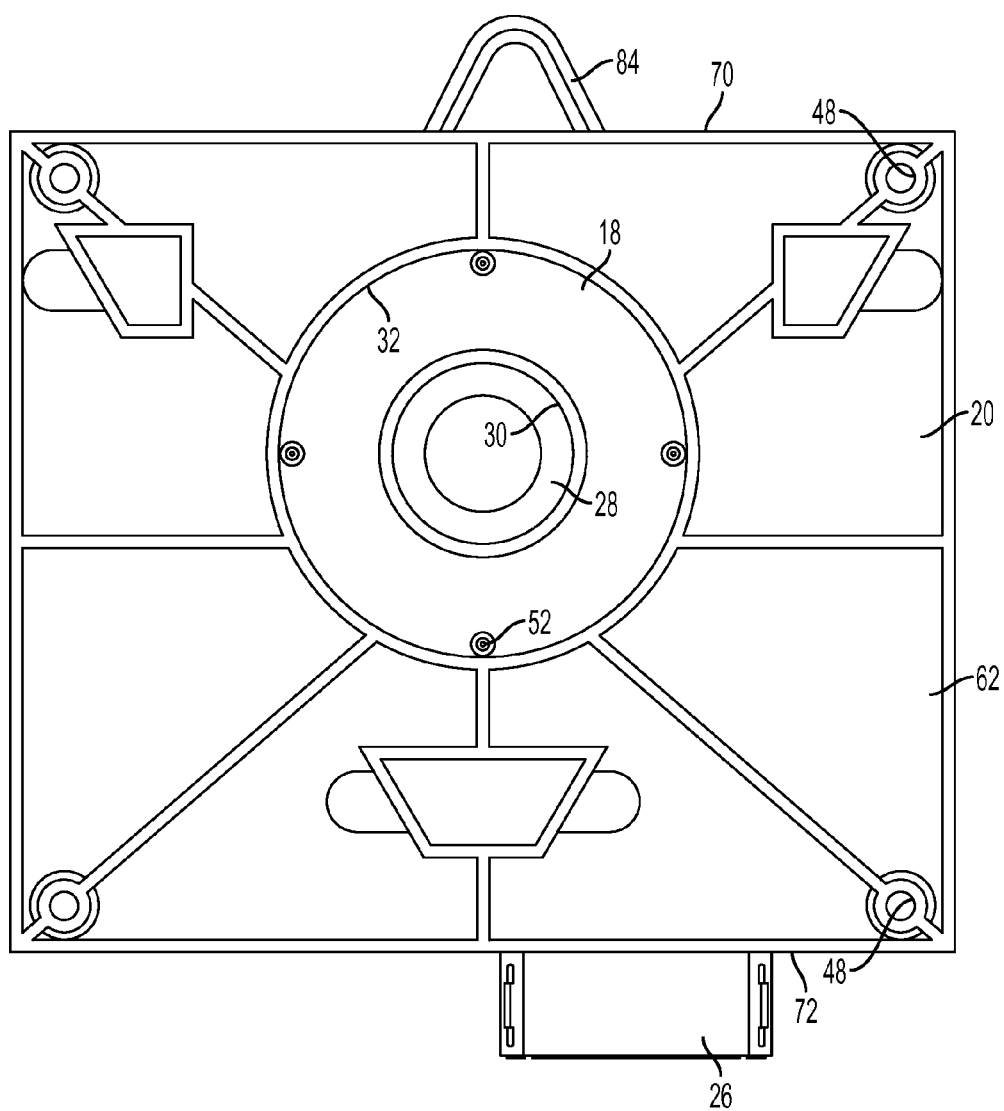
FIG. 8 is a rear view of the flow restricting apparatus attached to the connector assembly of FIG. 2 in accordance with one non-limiting embodiment.
Figure 9:
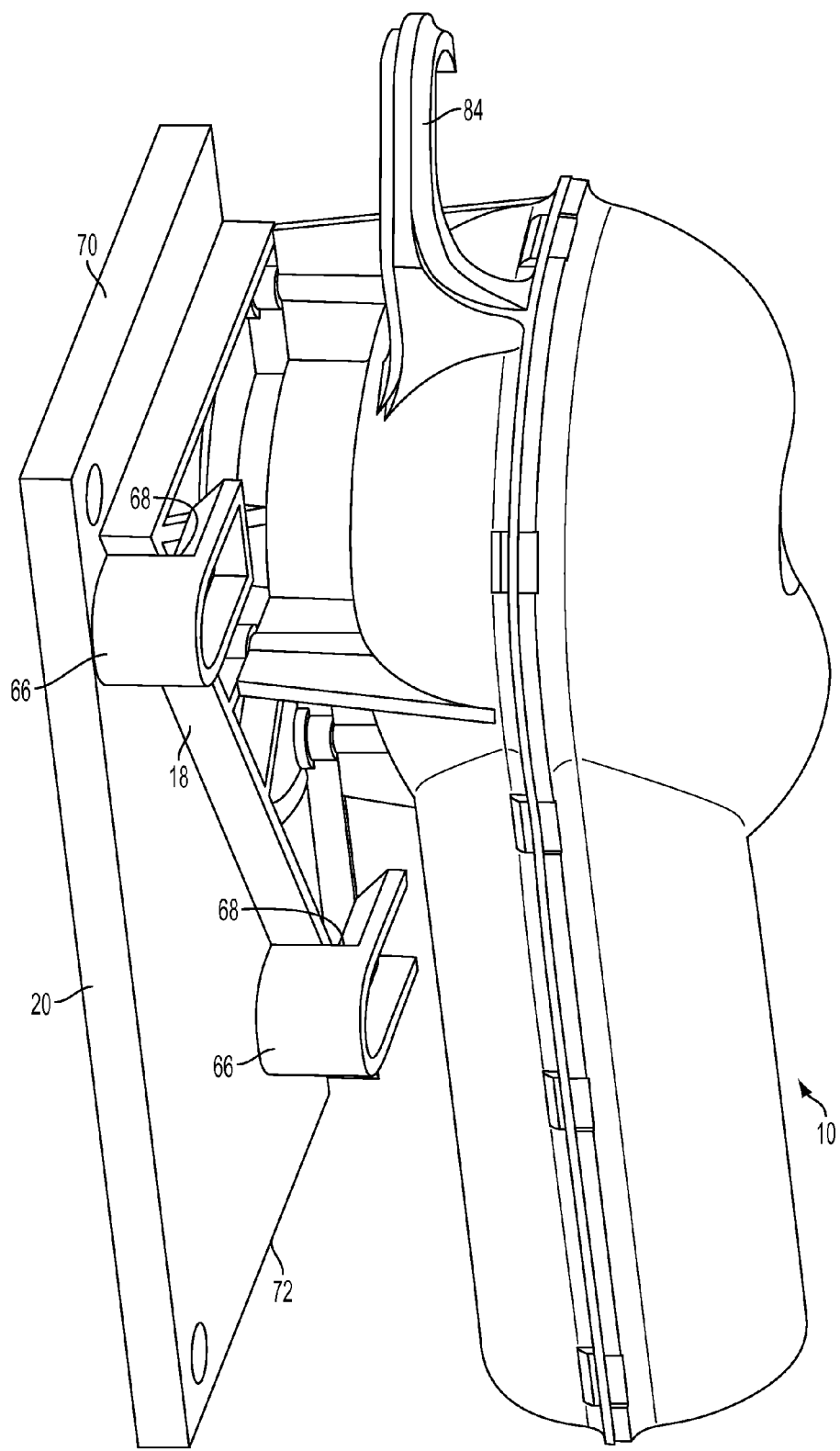
FIG. 9 is a partial perspective view of the flow restricting apparatus attached to the connector assembly of FIG. 2 in accordance with one non-limiting embodiment.
Figure 10:
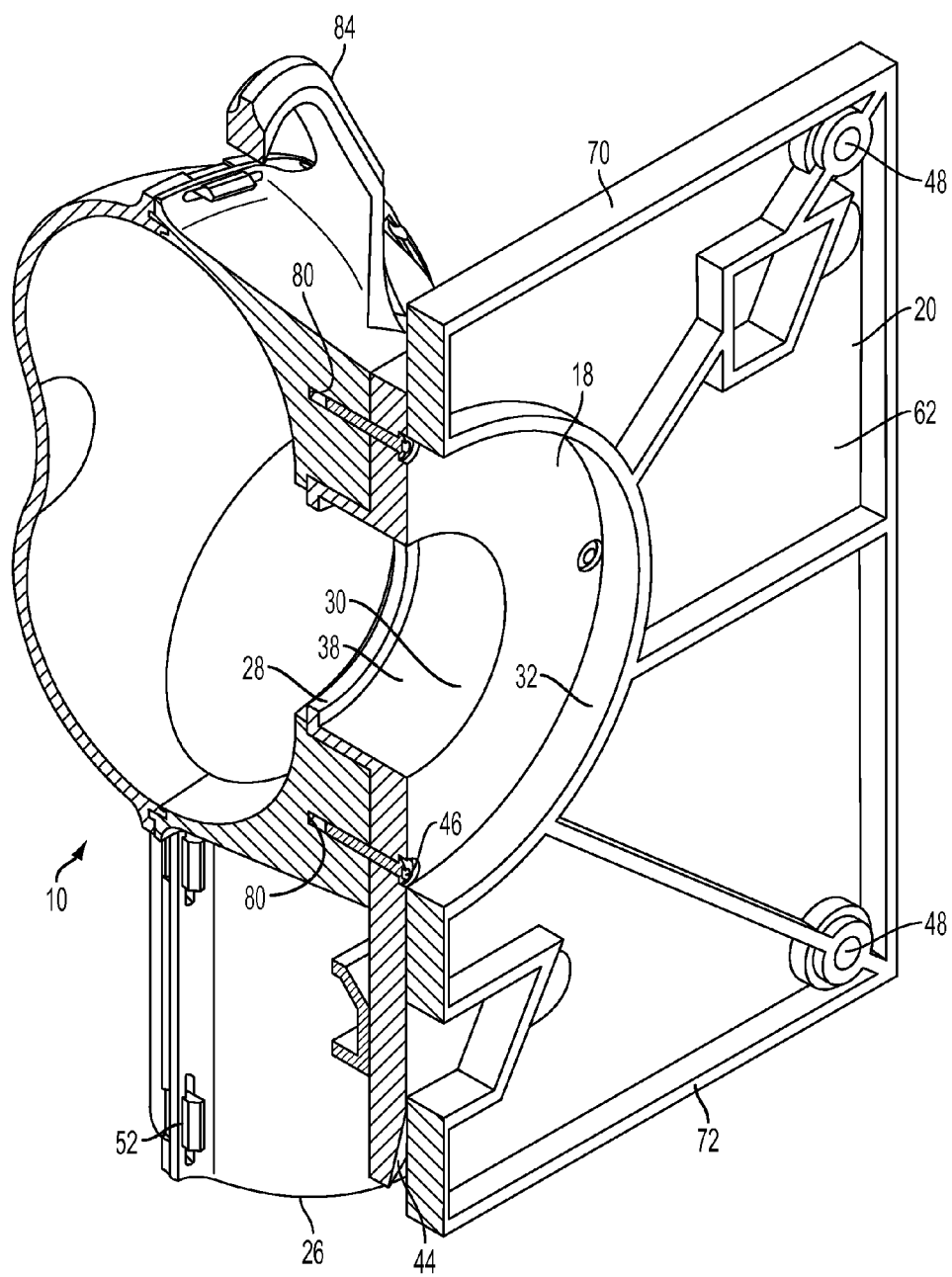
FIG. 10 is another partial perspective view of the flow restricting apparatus attached to the connector assembly of FIG. 2 in accordance with one non-limiting embodiment.
Figure 11:
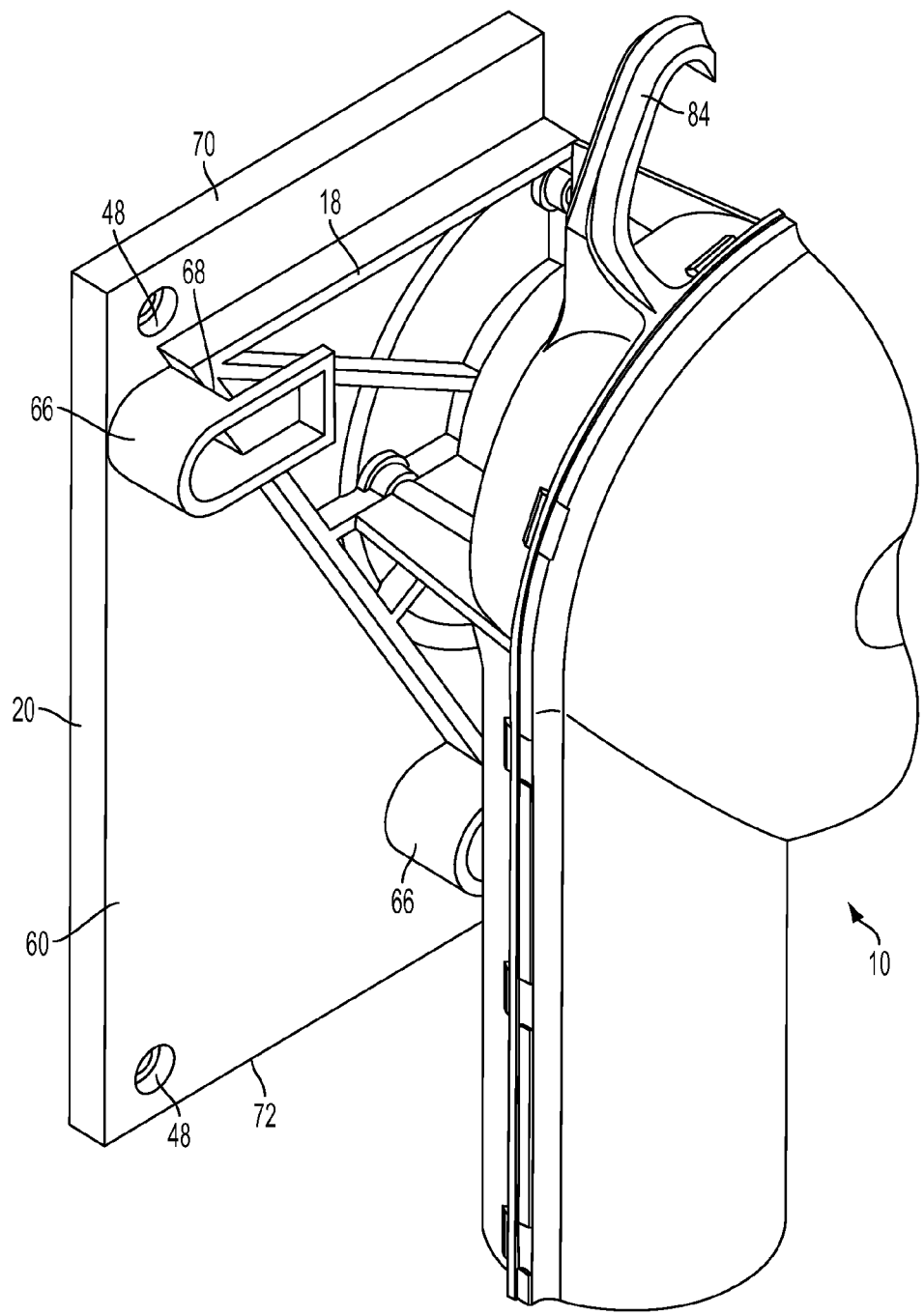
FIG. 11 is another partial perspective view of the flow restricting apparatus attached to the connector assembly of FIG. 2 in accordance with one non-limiting embodiment.
Figure 12:
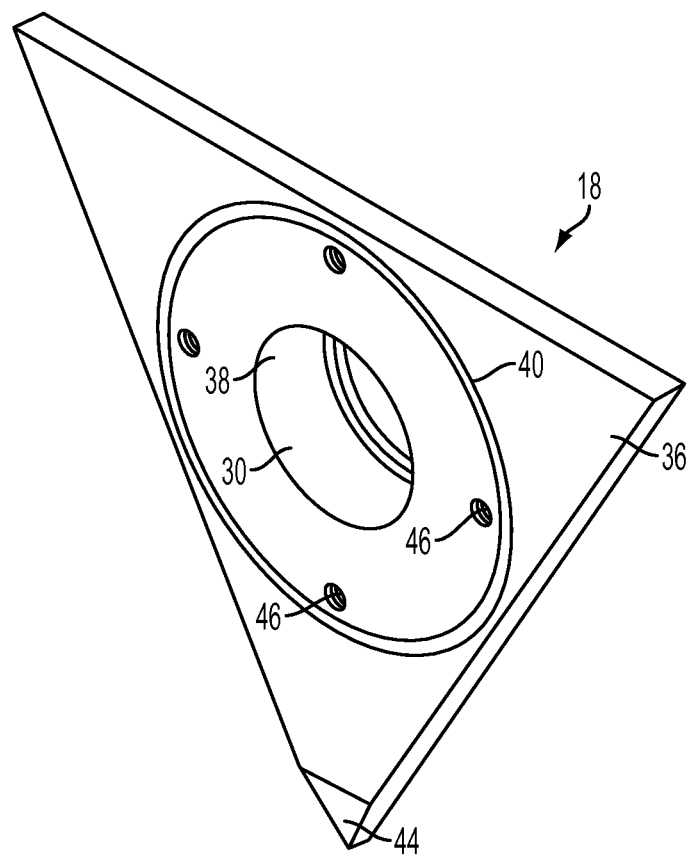
FIG. 12 is a front perspective view of a first member of the connector assembly of FIG. 2 in accordance with one non-limiting embodiment.
Figure 13:
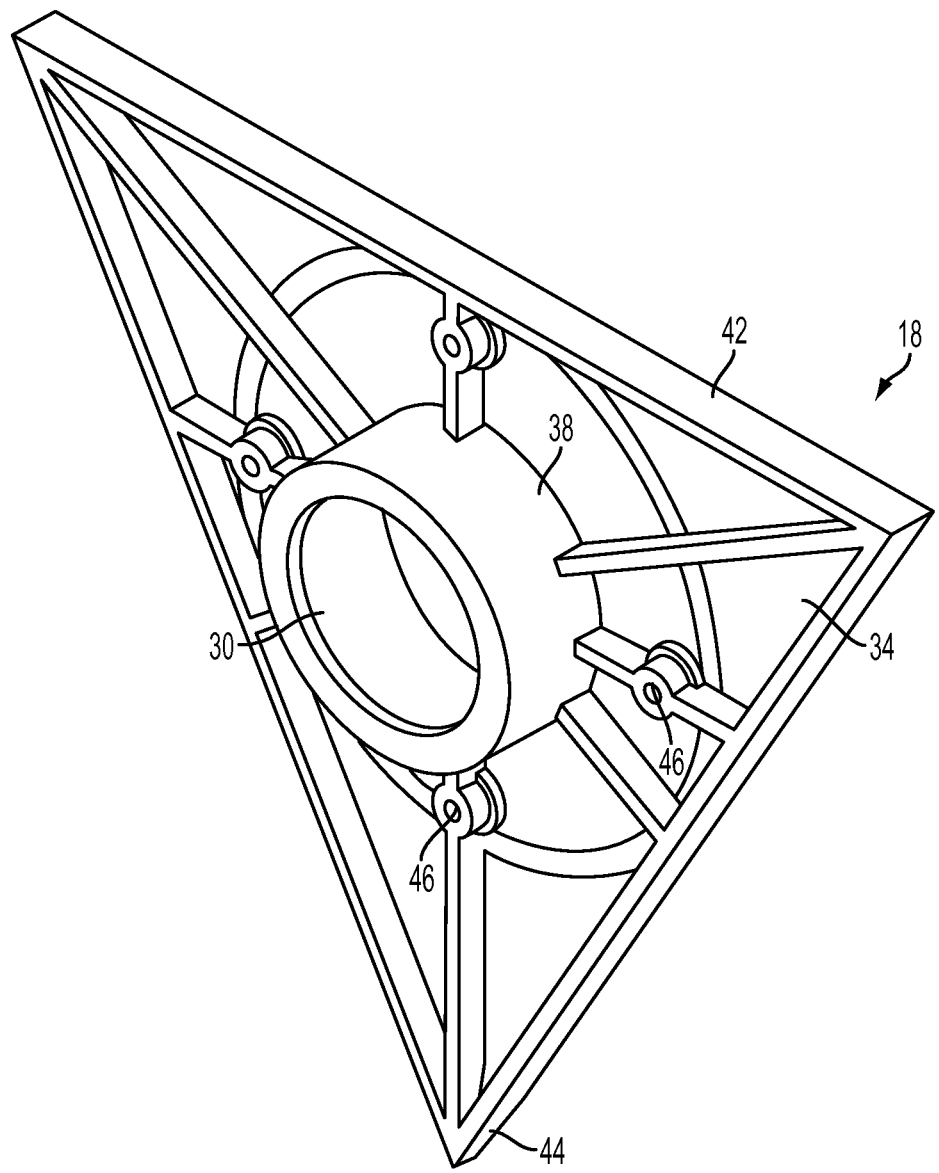
FIG. 13 is a rear perspective view of the first member of the connector assembly of FIG. 2 in accordance with one non-limiting embodiment.
Figure 14:
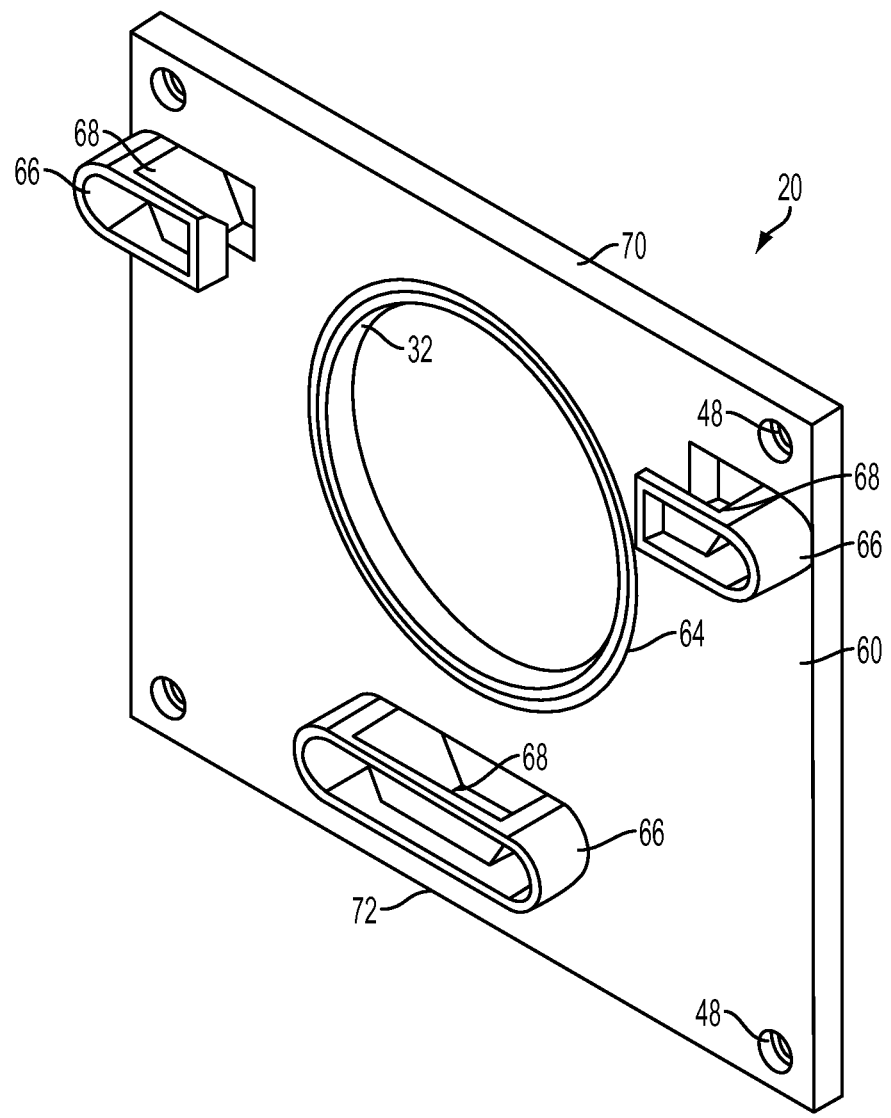
FIG. 14 is a front perspective view of the second member of the connector assembly of FIG. 2 in accordance with one non-limiting embodiment.
Figure 15:
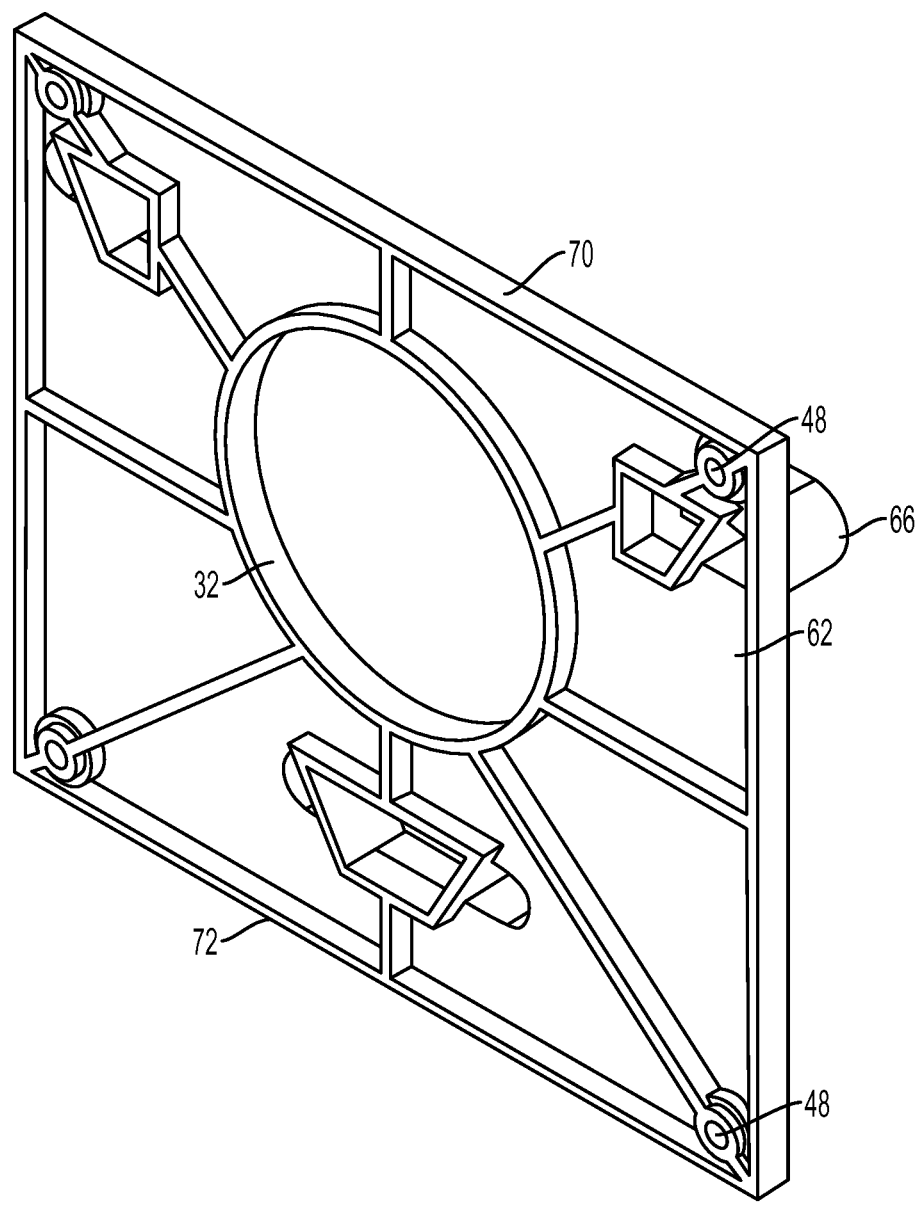
FIG. 15 is a rear perspective view of the second member of the connector assembly of FIG. 2 in accordance with one non-limiting embodiment.
Figure 16:
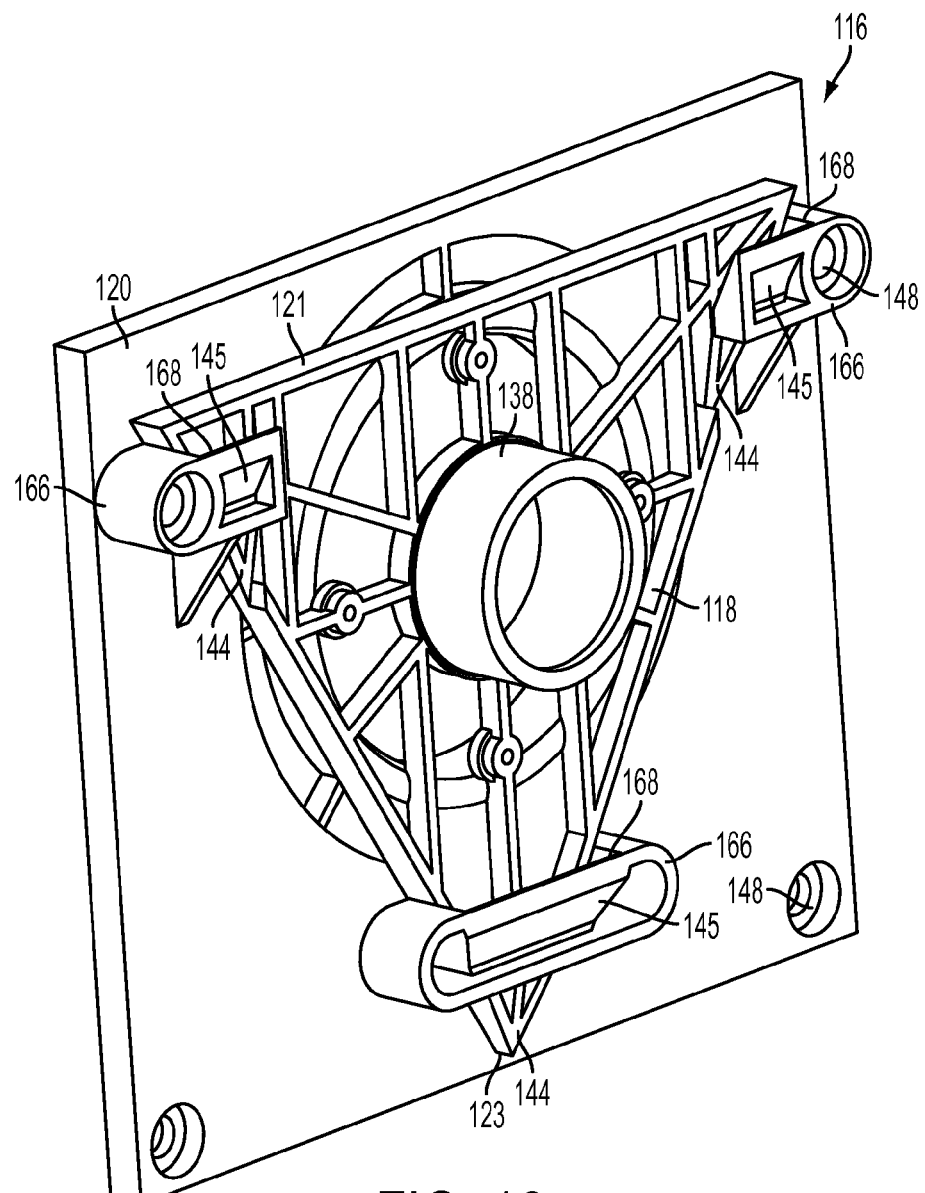
FIG. 16 is a perspective view of a connector assembly for a flow restricting apparatus in accordance with one non-limiting embodiment.
Figure 17:
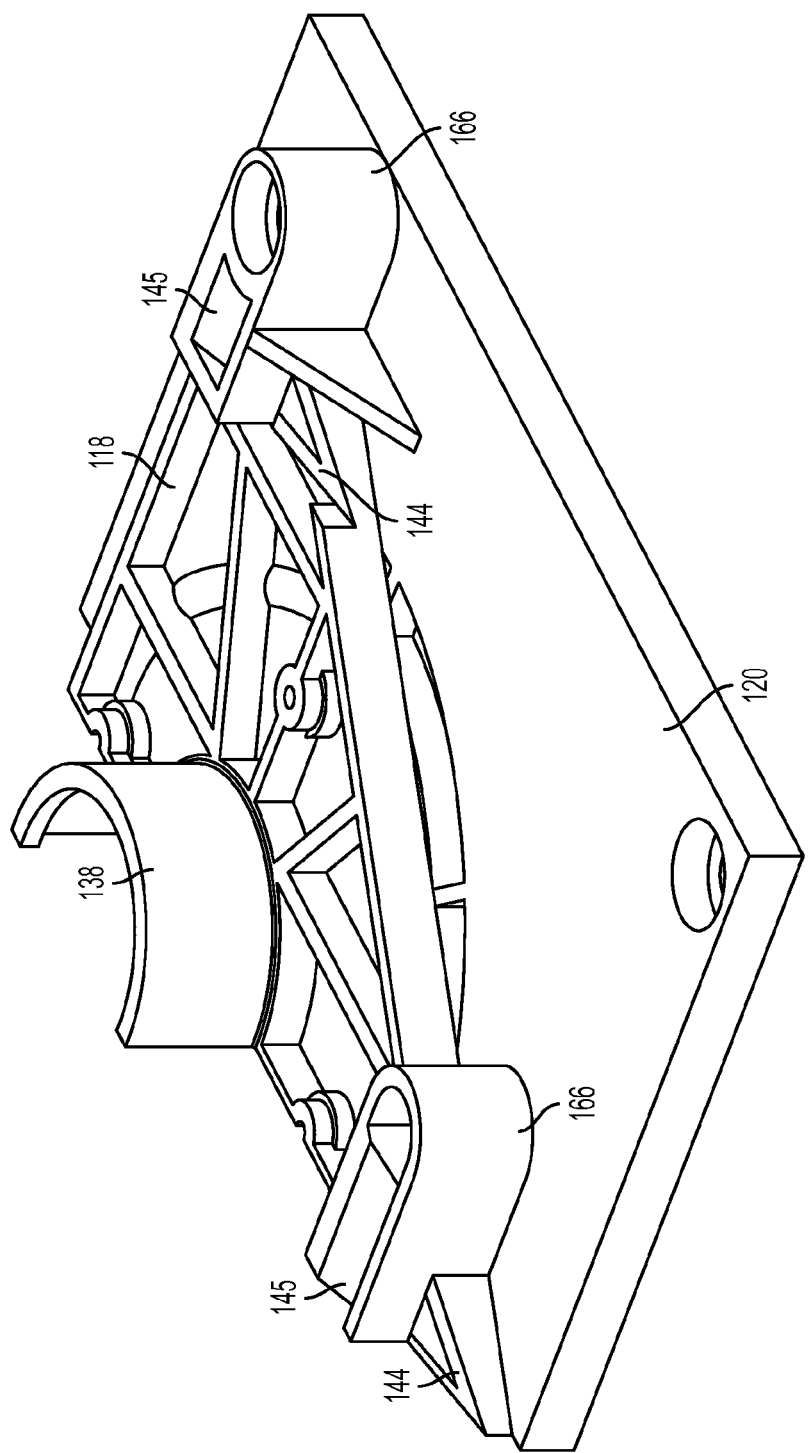
FIG. 17 is partial perspective view of the connector assembly of FIG. 16 in accordance with one non-limiting embodiment.
Figure 18:
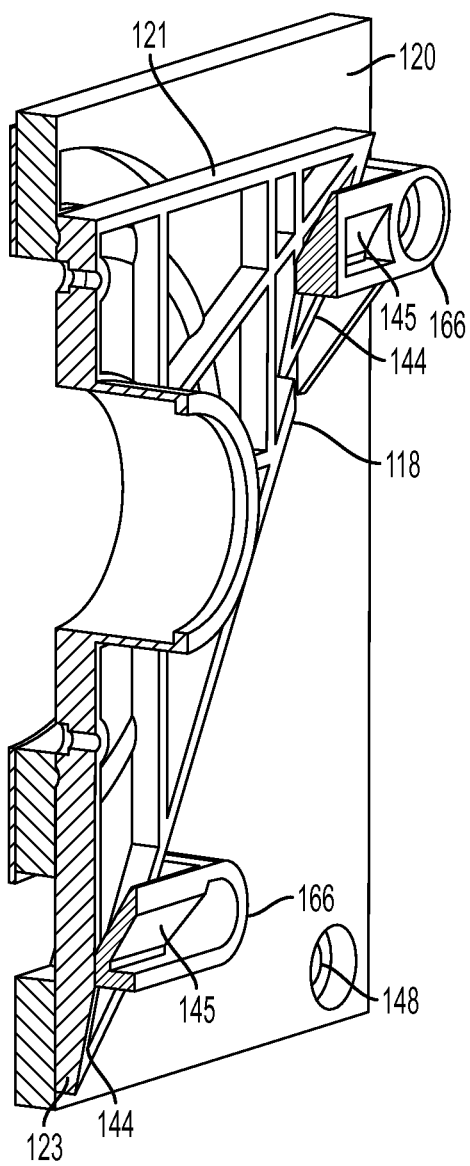
FIG. 18 is another partial perspective view of the connector assembly of FIG. 16 in accordance with one non-limiting embodiment.
Figure 19:
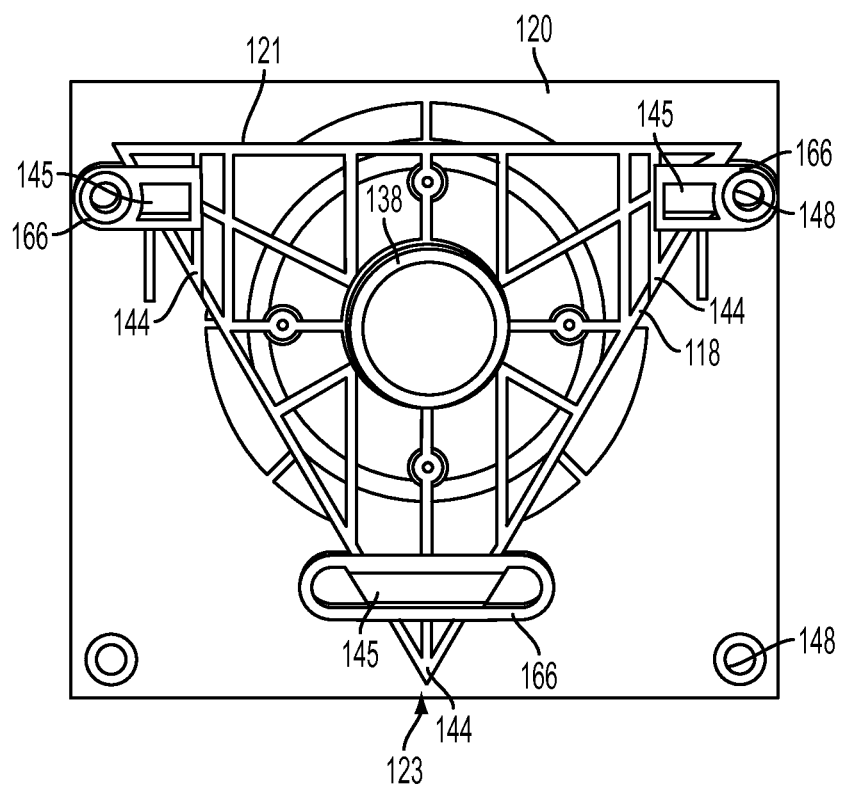
FIG. 19 is a front view of the connector assembly of FIG. 16 in accordance with one non-limiting embodiment.
Figure 20:
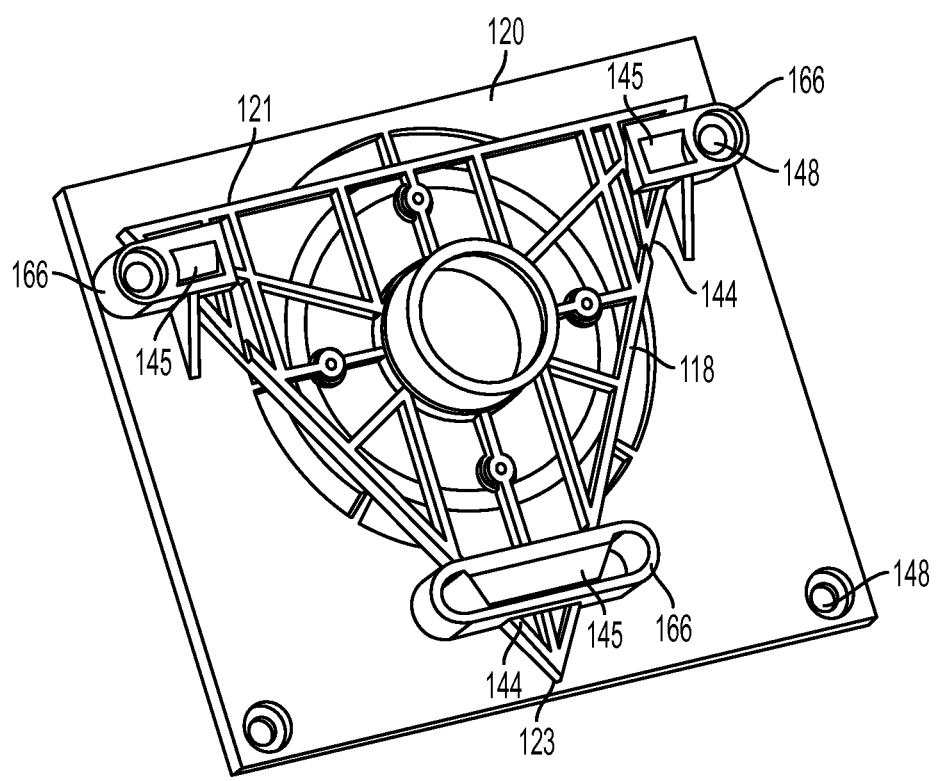
FIGS. 20 and 21 are perspective views of the connector assembly of FIG. 16 in accordance with various non-limiting embodiments.
Figure 21:
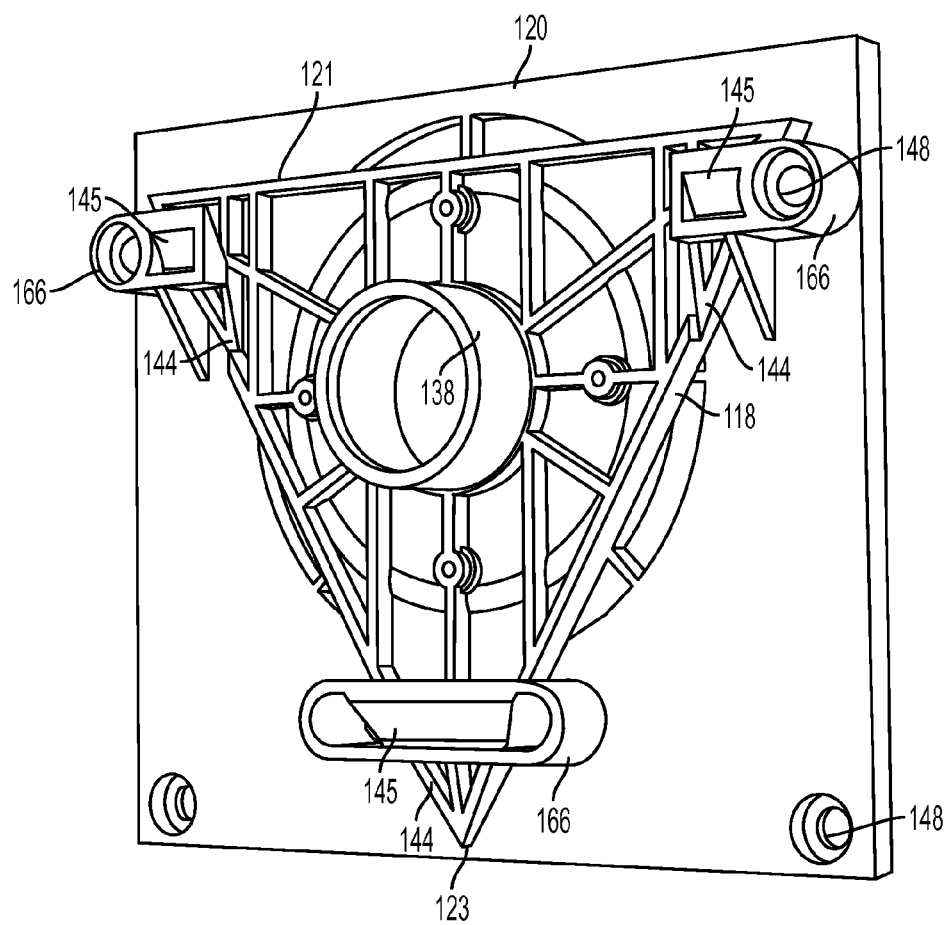

In one embodiment, referring to FIGS. 1 and 4, during installation of the connector assembly 16 or 116, the second member 20 can receive the end portion of the outlet conduit 14. The first member 18 can be engaged with the vortex valve 10 using the connection members 52 and the apertures 46 and 80, as described above. Once the first member 18 is engaged with the vortex valve 10, the vortex valve 10 and the first member 18 (as an assembly) can be lowered, positioned, moved, and/or slide into engagement with the second member 20, as described herein. When the first member 18 is engaged with the second member 20, the outlet 28 of the vortex valve 10, the bore 30 of the first member 18, the bore 32 of the second member 20, and the inlet opening of the outlet conduit 14 can be in fluid communication such that the fluid can flow from the reservoir 12 to the outlet conduit 14. In one embodiment, the first member 18 can be removably engaged with the second member 20 such that the vortex valve 10 and the first member 18 can be removed from the reservoir 12, drainage gully, and/or other structure for periodic maintenance, replacement, and/or monitoring of the vortex valve 10, for example.

In one embodiment, the first member 18 or 118 and the second member 20 or 120 can be comprised of a thermoplastic material, such as PVC, a thermoset material, and/or a metal material, for example.

In one embodiment, referring to FIGS. 30-37, a connector assembly 216 for a fluid flow restricting apparatus, such as vortex valve 210, for example, can comprise a first member 218, a second member 220, a seal 221, a sealing means, and an insert 225. Similar numbers (e.g., 18, 218), as discussed above, will denote the same or similar components in the description of these embodiments unless otherwise noted. In one embodiment, the first member 218 can comprise a first face 234, a second face 236, and a bore 230 defined through the first member 218 at least partially intermediate the first face 234 and the second face 236. The first face 234 can comprise tapered or angled portions 244 similar to that described herein. The first member 218 can be bolted or otherwise attached to a mounting plate 219 of the vortex valve 210 using connection members 252 and associated nuts 253. The second face 236 can comprise a flat surface 241 (see e.g., FIG. 37). Similar to the first member 18 described above, the first member 218 can comprise apertures 246 configured to receive the connection members 252.

In one embodiment, the insert 225 can comprise a body 227 defining an aperture 229 therethrough and a flanged portion 231. The flanged portion 231 can extend outwardly from the body 227. A surface of the flanged portion 231 can be configured to engage the second face 236 of the first member 218 when the insert 225 is at least partially positioned within the bore 230. In one embodiment, the surface can be beveled, for example. The flanged portion 231 can prevent the insert 225 from being fully slidable through the bore 230 in the first member 218 and can help retain the insert 225 engaged with the first member 218. The body 227 of the insert 225 can extend into an outlet 228 of the vortex valve 210 and can form a sealed connection with the outlet 228 when the first member 218 is engaged with the mounting plate 219 of the vortex valve 210.

In one embodiment, a kit or set of inserts 225 can be provided with the connector assembly 216. For example, two or more inserts 225 can be provided. The inserts 225 can each have different aperture 229 sizes, shapes, and/or diameters or perimeters such that a first insert can provide a different fluid flow rate therethrough than a second insert, for example. In various embodiments, the first insert can have a first size, shape, and/or diameter and the second insert can have a second size, shape, and/or diameter. In one embodiment, the first size, shape, and/or diameter can be different than, larger than, or smaller than the second size, shape, and/or diameter such that the first insert can provide a fluid flow rate therethrough that is different than, larger than, or smaller than the second insert, for example. In one embodiment, the insert 225 can comprise an end wall on a portion of the insert 225 most distal from the flanged portion 231. The end wall can comprise a portion of the aperture 229. In such an embodiment, the size, shape, and/or diameter of the portion of the aperture 229 on the end wall can be varied to vary the fluid flow rate through the insert 225, although the rest of the aperture 229 can be manufactured at a consistent size, shape, and/or diameter, for example.

In one embodiment, a particular fluid flow rate through the connector assembly 216 may be desired by the consumer. In such an embodiment, the connector assembly 216 may be provided to the consumer with the appropriate insert 225 for that particular desired flow rate. In other embodiments, consumers may desire to purchase a connector assembly 216 that can be adaptable for multiple flow rates. In such an instance, the connector assembly 216 can be provided with more than one insert 225 or a plurality of inserts 225, each having different fluid flow rates, for example. By providing the various inserts 225 with the connector assembly 216, the bore 230 of the first member 218 can be manufactured the same size or diameter in various embodiments, as compared to the embodiments discussed above where the size of the bore 30 is varied to adjust the flow rate of fluid through the first member 18. As a result, the inserts 225 can have a consistent outer perimeter independent of the aperture 229 size, shape, and/or diameter.

In one embodiment, the second member 220 can be similar to the second member 20 described above except that the second member 220 may not comprise the raised lip 64. Instead, the second member 220 can comprise a groove 235 for receiving a portion of a sealing means, such as gasket 237, for example. The gasket 237 can be at least partially positioned within the groove 235. In one embodiment, the gasket 237, when positioned at least partially within the groove 235, can extend from the groove 235 beyond a plane of the first side 260 of the second member 220 about ½ of its width, about ⅓ of its width, about ¼ of its width, and/or any other suitable portion of its width. The gasket 237 can extend from the groove 235 such that it can be compressed to create a fluid-tight, or substantially fluid tight, seal between the first member 218 and the second member 220 when the first member 218 is engaged with the second member 220. In one embodiment, the gasket 237 can be situated within the groove 235 or attached to the groove 235 using an adhesive, for example. In such an embodiment, the second face 236 of the first member 218 can be flat, or substantially flat, where the gasket 237 will contact the first member 218 such that the gasket 237 can be compressed against the second face 236 when the first member 218 is engaged with the second member 220. The second member 220 can be bolted or otherwise attached to the side wall 11 of the reservoir 12 using bolts and apertures 248. Similar to the second member 20, the second member 220 can comprise a bore 232 configured to receive an end portion of the outlet conduit 214. The end portion of the outlet conduit 214 can be attached to the second member 20 using fasteners, such as anchor bolts, for example.

In one embodiment, the second face 236 of the first member 218 can comprise a groove (not illustrated) configured to receive the gasket 237, for example. In such an embodiment, the first side 260 of the second member 220 can be flat, or substantially flat, where the first side 260 would contact the gasket 237. In various embodiments, a groove may not be provided in either of the first side 260 or the second face 236 and the gasket 237 can be compressed intermediate the first member 218 and the second member 220 when the first member 218 is engaged with the second member 220. In still other various embodiments, a groove can be provided on the first side 260 of the second member 220 and on the second face 236 of the first member 218. In such an embodiment, a first portion of the gasket 237 can be configured to be positioned within the groove on the second face 236 and a second portion of the gasket 237 can be configured to be positioned within the groove of the first side 260, for example. In such an embodiment, the gasket 237 can be positioned or attached in the groove either on the first side 260 or the second face 236 and then can be aligned with the groove on the other of the first side 260 or the second face 236 when the first member 218 is engaged with the second member 220. The gasket 237 can have any suitable thickness such that it is at least partially compressed when the first member 218 is engaged with the second member 220.

Although the gasket 237 is illustrated as the sealing means in FIGS. 30-37, the first and second members 218 and 220 can have the raised lip and groove configurations discussed above with respect to other embodiments either in addition to the gasket 237 and groove(s) or as a replacement to the gasket 237 and groove(s).

In one embodiment, the seal 221 can be configured to be positioned intermediate the side wall 11 of the reservoir 12 and the second side 262 of the second member 220. The seal 221 can create a fluid-tight, or substantially fluid-tight, seal intermediate the side wall 11 and the second member 220. In one embodiment, the seal 221 can comprise a neoprene foam material, for example, or any other suitable sealing material. In various embodiments, the seal 221 can be rectangular, circular, or otherwise shaped, for example, and can have any suitable thickness. The seal 221 can define a bore 239 therethrough configured to receive the end portion of the outlet conduit 214. The seal 221 can also comprise apertures 249 which can align with apertures 248 in the second member 220 such that the second member 220 and the seal 221 can be engaged with the side wall 11 of the reservoir 12. Although the seal 221 is illustrated as a separate component, those of skill in the art will recognize that a sealing substance can be positioned intermediate the side wall 11 and the second side 262 of the second member 220 to accomplish a similar or the same sealing result.

In various embodiments, fluid flow restricting apparatuses or assemblies used with the connector assemblies described herein can comprise vortex valves, P-trap assemblies, elbows, fluid flow restricting apertures in the first member (18, 118, or 218), odor control devices, floatable abatement control devices, and/or other suitable flow or fluid flow restricting apparatuses and/or assemblies as will be recognized by those of skill in the art. In one embodiment, referring to FIGS. 38-41, a fluid flow restricting assembly 310 can comprise an elbow 312, a coupling 314, and a flow restricting cap 316. In various embodiments, the fluid flow restricting assembly 310 can be attached to a first member 318 using an insert 325. The insert 325 can be similar to or the same as the insert 225 described above. The elbow 312 can comprise a first end portion 320 and a second end portion 322. The first end portion 320 of the elbow 312 can be configured to be engaged with or slid over a portion of the insert 325 after the insert 325 is engaged with the first member 318. The second end portion 322 of the elbow 312 can be engaged with or slid over a portion of the coupling 314. The flow restricting cap 316 can also be engaged with or slid over a portion of the coupling 314. In one embodiment, the flow restricting cap 316 may not be provided and a flow restriction plate defining a flow restricting aperture can be provided on the second end portion 322.

In one embodiment, the connections between the various components of the fluid flow restricting assembly 310 can be made using suitable adhesives, cements, suitable sealants, suitable fasteners, welding, and/or plastic welding, for example. In various embodiments, such connections can be fluid-tight, or substantially fluid-tight connections. In one embodiment, the coupling 314 may not be provided and the flow restricting cap 316, or another suitable flow restricting cap, can be engaged with the second end portion 322 of the elbow 312 directly. In other various embodiments, an elbow may be integrally formed with a flow restricting cap or a flow restricting plate on a second end portion. In such an embodiment, only a first end portion of the elbow would need to be engaged with or slid onto the insert 325 to make the connection of the fluid flow restricting assembly 310 and the insert 325. In one embodiment, a fluid flow restricting assembly can be formed of a single component. Such a single component fluid flow restricting assembly can be attached to the insert 325 or can be formed with the insert 325 or the first member 318.

In one embodiment, the flow restricting cap 316 can comprise an end wall 324 defining an aperture 326 therein. In various embodiments, more than one flow restricting cap 316 can be provided with a fluid flow restricting assembly. These flow restricting caps 316 can comprise differently sized or shaped apertures 326 in their end walls 324. Such a feature can allow a user of the fluid flow restricting assembly 310 to change the fluid flow rate through the fluid flow restricting assembly 310 merely by changing the flow restricting cap 316. In one embodiment, where the flow restricting cap 316 is integrally formed with the second end portion 322 of the elbow 312, more than one fluid flow restricting assembly can be provided with each fluid flow restricting assembly having a differently sized or shaped aperture in their end walls.

In one embodiment, the various components of the fluid flow restricting assembly can be comprised of sewer pipe, sewer pipe elbows, sewer pipe couplings, and/or sewer pipe caps, for example. In various embodiments, these components can have a diameter in the range of 3 inches to 20 inches, 5 inches to 15 inches, and 6 inches to 10 inches, for example.

While an example fluid flow restricting assembly has been described above and illustrated in the accompanying figures, those of skill in the art will recognize that other suitable fluid flow restricting assemblies are within the scope of the present disclosure. Furthermore, it should be recognized that a bore in a first member can be sized and shaped to itself provide an adequate flow restriction to fluid flow therethrough without the use of a vortex valve or a fluid flow restricting assembly. In such an embodiment, a bore in a second member can be the same size and shape as the bore in the first member or can be larger in size and shape than the bore in the first member. The term "larger", in this context, can mean having a larger area and/or diameter, for example.

While particular non-limiting embodiments of the present disclosure have been illustrated and described, those of skill in the art will recognize that various other changes and modifications can be made without departing from the spirit and scope of the present disclosure. It is therefore intended to cover in the appended claims all such changes and modifications that are within the scope of the present disclosure. Although dimensions are illustrated in some of the figures, those dimensions are meant as example embodiments and are not to be construed as limiting.

Although the various embodiments of the present disclosure have been described herein, many modifications and variations to those embodiments can be implemented. For example, different types of fluid flow restricting apparatuses may be employed. Furthermore, according to various embodiments, a single component may be replaced by multiple components, and multiple components may be replaced by a single component, to perform a given function or functions. The foregoing description and following claims are intended to cover all such modification and variations.

What is claimed is:

1. A connector assembly for a fluid flow restricting apparatus, the fluid flow restricting apparatus comprising an outlet configured to be in fluid communication with an outlet conduit, the connector assembly comprising:
    a first member configured to be engaged with the fluid flow restricting apparatus, the first member comprising:
        a first face;
        a second face;
        a bore defined through the first member;
        an annular flange extending from the first face and configured to be positioned adjacent to at least a portion of the outlet, wherein the annular flange defines a portion of the bore; and
        a groove defined in the second face, wherein the groove at least partially surrounds the bore; and
    a second member comprising:
        a first side;
        a second side;
        a bore defined through the second member intermediate the first side and the second side; and
        at least two projections extending outwardly from the first side of the second member, each of the projections forming a receiving portion;
        a raised lip extending from the first side;
    wherein the first member is configured to be at least partially guided by the at least two projections during insertion onto the second member and at least partially positioned within the receiving portions when engaged with the second member to form a connection between the first member and the second member; and
    wherein the raised lip of the second member is configured to be engaged with the groove defined in the second face of the first member when the first member is inserted onto the second member, and wherein the engagement of the groove with the raised lip creates a fluid-tight connection between the first side of the second member and the second face of the first member when the first member is inserted onto the second member.

2. The connector assembly of claim 1, wherein the first member comprises a substantially triangular shape.

3. The connector assembly of claim 1, wherein the first member comprises a tapered portion configured to be engaged with at least one of the at least two projections.

4. The connector assembly of claim 1, wherein the at least two projections comprise:
    a first projection;
    a second projection; and
    a third projection;
    wherein the second member comprises a top edge and a bottom edge, wherein the first projection and the second projection are positioned proximate to the top edge, and wherein the third projection is positioned proximate to the bottom edge.

5. The connector assembly of claim 1, wherein the first member comprises at least one tapered portion configured to be engaged with a tapered portion on at least one of the receiving portions.

6. The connector assembly of claim 1, wherein the bore defined through the first member has an area that is less than an area of the bore through the second member.

7. The connector assembly of claim 1, wherein the first member is configured to slidably engage the at least two projections of the second member.

8. A connector assembly for a fluid flow restricting apparatus, the fluid flow restricting apparatus comprising an outlet configured to be in fluid communication with an outlet conduit, the connector assembly comprising:
    a first member configured to be engaged with the fluid flow restricting apparatus at least partially about the outlet, the first member comprising:
        a first face;
        a second face; and
        a bore defined through the first member intermediate the first face and the second face; and
    a second member comprising:
        a first side;
        a second side;
        a top edge;
        a bottom edge;
        a bore defined through the second member intermediate the first side and the second side, wherein the bore of the first member is configured to at least partially align with the bore of the second member when the first member is engaged with the second member; and
        first, second, and third projections extending outwardly from the first side, each of the first, second, and third projections forming a receiving portion, wherein the first projection and the second projection are positioned proximate to the top edge, and wherein the third projection is positioned proximate to a midpoint of the bottom edge;
    wherein the first member comprises an outer edge, and wherein at least portion of the outer edge is configured to be engaged with the receiving portion when the first member is engaged with the second member.

9. The connector assembly of claim 8, wherein the first member comprises a groove defined in the second face, wherein the groove at least partially surrounds the bore in the first member, wherein the second member comprises a raised lip extending from the first side of the second member, and wherein the raised lip is configured to be engaged with the groove in a substantially fluid-tight manner when the first member is engaged with the second member.

10. The connector assembly of claim 9, wherein the groove comprises an arcuate portion, wherein the raised lip comprises an arcuate portion, and wherein the arcuate portion of the groove is configured to be engaged with the arcuate portion of the raised lip to create a fluid-tight seal between the second face of the first member and the first side of the second member.

11. The connector assembly of claim 8, wherein the first member is configured to slidably engage the at least one projection of the second member.

12. The connector assembly of claim 8, wherein the first member comprises an annular projection extending outwardly from the first face, and wherein the annular projection is configured to be in fluid communication with the outlet when the first member is engaged with the fluid flow restricting apparatus.

13. The connector assembly of claim 8, wherein the first member has a triangular perimeter.

14. The connector assembly of claim 8, wherein the second member has a perimeter shape that is selected from the group consisting of a rectangular perimeter and a square perimeter.

15. The connector assembly of claim 8, wherein the first member comprises one or more tapered portions configured to be engaged with the at least one projection.

16. The connector assembly of claim 8, wherein the bore defined through the first member has an area that is less than an area of the bore through the second member.

17. A connector assembly for a fluid flow restricting apparatus, the fluid flow restricting apparatus comprising an outlet configured to be in fluid communication with an outlet conduit, the connector assembly comprising:
   a first member configured to be engaged with the fluid flow restricting apparatus at least partially about the outlet, the first member comprising:
      a first face;
      a second face; and
      a bore defined through the first member;
   a second member comprising:
      a first side;
      a second side;
      a top edge;
      a bottom edge;
      a bore defined through the second member, wherein the bore of the first member is configured to at least partially align with the bore of the second member when the first member is engaged with the second member; and
      first, second and third projections extending outwardly from the first side of the second member, the first, second and third projections each forming a receiving portion configured to receive a portion of the first member, wherein the first projection and the second projection are positioned proximate to the top edge, and wherein the third projection is positioned proximate to a midpoint of the bottom edge; and
   sealing means for sealing positioned intermediate the first member and the second member.

18. The connector assembly of claim 17, wherein the sealing means for sealing comprises:
   a groove defined in the second face of the first member; and
   a raised lip extending from the first side of the second member, wherein the raised lip is configured to be engaged with the groove, and wherein the engagement of the groove with the raised lip creates a substantially fluid-tight connection between the first side of the second member and the second face of the first member.

19. The connector assembly of claim 17, wherein the sealing means for sealing comprises:
   a raised lip extending from the second face of the first member; and
   a groove defined in the first side of the second member, wherein the raised lip is configured to be engaged with the groove, and wherein the engagement of the groove with the raised lip creates a substantially fluid-tight connection between the first side of the second member and the second face of the first member.

20. The connector assembly of claim 17, wherein the sealing means for sealing comprises:
   a gasket configured to be positioned intermediate the second face of the first member and the first side of the second member when the first member is engaged with the second member.

21. The connector assembly of claim 17, wherein the sealing means for sealing comprises:
   a gasket; and
   a groove defined in the first side of the second member, wherein the gasket is configured to be at least partially positioned within the groove.

22. The connector assembly of claim 17, wherein the sealing means for sealing comprises:
   a gasket; and
   a groove defined in the second face of the first member, wherein the gasket is configured to be at least partially positioned within the groove.

23. The connector assembly of claim 17, wherein the fluid flow restricting apparatus comprises a vortex valve.

24. The connector assembly of claim 17, wherein the bore defined through the first member has an area that is less than an area of the bore through the second member.

25. The connector assembly of claim 17, wherein the first member is configured to slidably engage the at least one projection of the second member.

\* \* \* \* \*